(12) United States Patent
Bradley et al.

(10) Patent No.: US 11,023,943 B1
(45) Date of Patent: Jun. 1, 2021

(54) METHODS, SYSTEMS, AND COMPUTER STORAGE MEDIUMS FOR REEL CONFIGURATION

(71) Applicant: Southwire Company, LLC, Carrollton, GA (US)

(72) Inventors: Michael Adam Bradley, Carrollton, GA (US); David Brian McCardel, Marietta, GA (US); Timothy Scott Powers, Carrollton, GA (US); Andrew Vlahopoulos, Newnan, GA (US); Ann Montgomery Lewis, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 74 days.

(21) Appl. No.: 16/564,343

(22) Filed: Sep. 9, 2019

Related U.S. Application Data

(63) Continuation of application No. 14/560,477, filed on Dec. 4, 2014, now Pat. No. 10,410,267.

(60) Provisional application No. 61/911,819, filed on Dec. 4, 2013.

(51) Int. Cl.
*G06Q 30/00* (2012.01)
*G06Q 30/06* (2012.01)

(52) U.S. Cl.
CPC ..... *G06Q 30/0621* (2013.01); *G06Q 30/0611* (2013.01)

(58) Field of Classification Search
CPC .............. G06Q 30/0621; G06Q 30/0611
See application file for complete search history.

(56) References Cited

U.S. PATENT DOCUMENTS

| 3,789,099 | A | * | 1/1974 | Garrett | H01B 13/323 156/48 |
|---|---|---|---|---|---|
| 5,570,291 | A | | 10/1996 | Dudle | |
| 5,590,749 | A | | 1/1997 | Wagner | |
| 5,689,417 | A | * | 11/1997 | Shockley | G06Q 30/04 700/104 |
| 6,114,632 | A | * | 9/2000 | Planas, Sr. | H01B 9/003 174/117 R |
| 6,889,201 | B1 | * | 5/2005 | Reed | G06Q 10/087 705/26.5 |
| 7,208,684 | B2 | * | 4/2007 | Fetterolf, Sr. | H01B 7/225 174/113 R |
| 7,299,441 | B2 | | 11/2007 | Chang | |
| 7,451,106 | B1 | | 11/2008 | Gindlesperger | |
| 8,544,786 | B2 | | 10/2013 | Chambers | |
| 9,087,164 | B2 | | 7/2015 | Perry | |
| 2012/0015126 | A1 | | 1/2012 | Tatsuzawa | |
| 2013/0076217 | A1 | | 3/2013 | Thompson | |

(Continued)

OTHER PUBLICATIONS https://web.archive.Org/web/20110706213906/http://www.southwire.com/ (Year: 2011).*

(Continued)

*Primary Examiner* — Matthew E Zimmerman
(74) *Attorney, Agent, or Firm* — Hartman & Citrin LLC

(57) ABSTRACT

Concepts and technologies disclosed herein are directed to configuring a reel containing one or more circuits of a conductor. According to one aspect of the concepts and technologies, a request to create a circuit to be installed on the reel is received. In addition, configurations associated with the circuit are received.

20 Claims, 33 Drawing Sheets

(56) References Cited

U.S. PATENT DOCUMENTS

2014/0214588 A1    7/2014   Verchere
2014/0297013 A1   10/2014  Huffine

OTHER PUBLICATIONS

U.S. Office Action dated Jun. 15, 2018 in U.S. Appl. No. 14/560,477.
U.S. Notice of Allowance dated Apr. 9, 2019 in U.S. Appl. No. 14/560,477.

* cited by examiner

| PROJECT REELS include SIMpull Heads | SHIPPING | CIRCUITS | DETAILS |
|---|---|---|---|
| Pull 1<br>1,010.6 LBS,<br>40 x 27.5 IN<br>REEL TYPE N25F | SIMpull Truck | 3 | ⌄ |
| Pull 4<br>3,308.2 LBS,<br>66 x 36 IN<br>REEL TYPE R16 | SIMpull Truck | 4 | ⌄ |
| Pull 3<br>3,436.7 LBS,<br>66 x 36 IN<br>REEL TYPE R16 | SIMpull Truck | 3 | ⌄ |
| Pull 5<br>2,339.3 LBS,<br>60 x 35.5 IN<br>REEL TYPE A62R | SIMpull Truck | 3 | ⌄ |
| Pull 2<br>1,010.6 LBS,<br>40 x 27.5 IN<br>REEL TYPE N25F | SIMpull Truck | 3 | ⌄ |

Configurator Order Key —— 3002
Project   MEDICAL EQ —— 3004                                    Page 1 of 3

| Contact Name | John Doe —— 3006 |
|---|---|
| Email | johndoe@email.com —— 3008 |
| Contact Number | (555) 555-1212 —— 3010 |

Reel Name: MSB-B —— 3012                                   Reel Number: 1
Reel N15, 32 in x 25 in, Total Weight 1,124.6 lbs —— 3014       Pulls: 2
                                                         3016

| MSB-B —— 3012 | 3024 — Pull 1 of 2 | | | | 3018 — Length: 75ft | | | |
|---|---|---|---|---|---|---|---|---|
| Conductors 3022 | ⊛ | ⊛ | ⊛ —— 3026 | | 3020 | | | |
| Type —— 3028 | CU THHN | CU THHN | CU THHN | | | | | |
| Size —— 3030 | 500 | 500 | 500 | | | | | |
| Color —— 3032 | Brown | Orange | Yellow | | | | | |
| Head —— 3034 | Yes | Yes | Yes | | | | | |
| MSB-B —— 3012 | 3024 — Pull 2 of 2 | | | | Length: 75ft | | | |
| Conductors 3022 | ⊛ | ⊛ | ⊛ —— 3026 | | 3020 | | | |
| Type —— 3028 | CU THHN | CU THHN | CU THHN | | | | | |
| Size —— 3030 | 500 | 500 | 500 | | | | | |
| Color —— 3032 | Brown | Orange | Yellow | | | | | |
| Head —— 3034 | Yes | Yes | Yes | | | | | |

Configurator Order Key — 3002
Project   MEDICAL EQ — 3004

Page 2 of 3

| | |
|---|---|
| Contact Name | John Doe — 3006 |
| Email | johndoe@email.com — 3008 |
| Contact Number | (555) 555-1212 — 3010 |

Reel Name: ATS — 3012
Reel N&, 30 in x 20 in, Total Weight 474.9 lbs — 3014
Reel Number: 2
3016 — Pulls: 2

| ATS — 3012 | 3024 — Pull 1 of 2 | | | | 3018 — Length: 30ft | | | |
|---|---|---|---|---|---|---|---|---|
| Conductors 3022 | ⊙ | ⊙ | ⊙ — 3026 | | 3020 | | | |
| Type — 3028 | CU THHN | CU THHN | CU THHN | | | | | |
| Size — 3030 | 500 | 500 | 500 | | | | | |
| Color — 3032 | Brown | Orange | Yellow | | | | | |
| Head — 3034 | Yes | Yes | Yes | | | | | |
| ATS — 3012 | 3024 — Pull 2 of 2 | | | | Length: 30ft | | | |
| Conductors 3022 | ⊙ | ⊙ | ⊙ — 3026 | | 3020 | | | |
| Type — 3028 | CU THHN | CU THHN | CU THHN | | | | | |
| Size — 3030 | 500 | 500 | 500 | | | | | |
| Color — 3032 | Brown | Orange | Yellow | | | | | |
| Head — 3034 | Yes | Yes | Yes | | | | | |

Configurator Order Key — 3002
Project   MEDICAL EQ — 3004

Page 3 of 3

| | 3006 |
|---|---|
| Contact Name | John Doe |
| Email | johndoe@email.com |
| Contact Number | (555) 555-1212 |

Shipping Summary — 3036

| Reel Name | Standard Shipping | A-Frames | SIMpull Truck |
|---|---|---|---|
| MSB-B | ✓ | | |
| ATS | ✓ | | |
| 4CED2 | ✓ | | |
| 4CED2 | ✓ | | |
| 4CED2 GRD | ✓ | | |
| 4CED2 | | | ✓ |
| 4CED2 GRD | | | ✓ |
| 4CED2 | | ✓ | |
| 4' A-Frames | | 1 | 0 |
| 6' A-Frames | | 0 | 2 |
| Total A-Frames | | 1 | 2 |

*FIG. 30C*

METHODS, SYSTEMS, AND COMPUTER STORAGE MEDIUMS FOR REEL CONFIGURATION

CROSS-REFERENCE TO RELATED APPLICATIONS

This application is a continuation of U.S. patent application Ser. No. 14/560,477, entitled "Methods, Systems, and Computer Storage Mediums for Reel Configuration," filed Dec. 4, 2014, now U.S. Pat. No. 10,410,267, which is expressly incorporated herein by reference and which claims priority to U.S. Provisional Patent Application No. 61/911,819 filed on Dec. 4, 2013, entitled "Reel Configurator," which is expressly incorporated herein by reference in its entirety.

BACKGROUND

This application relates generally to a reel configurator application. More particularly, the disclosure provided herein relates to a system, method, and computer readable medium for configuring and ordering multiple cables, circuits, wires, etc., on a reel.

SUMMARY

The present disclosure is directed to a method for configuring a reel. A first request to create a first circuit to be installed on the reel and configurations associated with the first circuit are received at a processor. An order for the reel is submitted to a supplier for a quote by the processor.

According to another aspect of the concepts and technologies disclosed herein, a system for configuring a reel is disclosed. The system may include a processor and a memory that stores instructions that, when executed by the processor, cause the processor to perform operations. The operations may include receiving a first request to create a first circuit to be installed on the reel, receiving configurations associated with the first circuit, and submitting an order for the reel to a supplier for a quote.

According to another aspect of the concepts and technologies disclosed herein, a computer storage medium can store instructions that, when executed by a processor, cause the processor to perform operations. The operations may include receiving a first request to create a first circuit to be installed on a reel, receiving configurations associated with the first circuit, and submitting an order for the reel to a supplier for a quote.

Consistent with exemplary embodiments, the configurations associated with the first circuit may comprise a first conductor type of a first conductor to be loaded on the reel, a first conductor size of the first conductor to be loaded on the reel, a first conductor length of the first conductor to be loaded on the reel, and a first conductor color of the first conductor to be loaded on the reel.

In addition, the methods and operations may further include receiving, at the processor, a second request to create a second circuit to be installed on the reel. Exemplary embodiments may also include receiving second configurations associated with the second circuit, the second configurations comprising a second conductor type of a second conductor to be loaded on the reel, a second conductor size of the second conductor to be loaded on the reel, a second conductor length of the second conductor to be loaded on the reel, and a second conductor color of the conductor to be loaded on the reel.

The methods and operations may further include receiving, at the processor, a reposition request, the reposition request causing the first circuit to be repositioned such that the first circuit is to be installed on top of the second circuit. In addition, the methods and operations may comprise receiving, at the processor, a deletion request, the deletion request deleting either the first circuit or the second circuit. The methods and operations may further include receiving, at the processor, a shipping configuration for the reel. Moreover, the methods and operations may further include creating, by the processor, a project, the reel being associated with the project; and receiving, at the processor, global restrictions for the project.

BRIEF DESCRIPTION OF THE DRAWINGS

The accompanying drawings, which are incorporated in and constitute a part of this disclosure, illustrate various embodiments of the present invention. In the drawings:

FIGS. 3-31 show screenshots of a reel configurator application used to implement the method shown in FIG. 2, according to an illustrative embodiment.

DESCRIPTION

Figure 1:
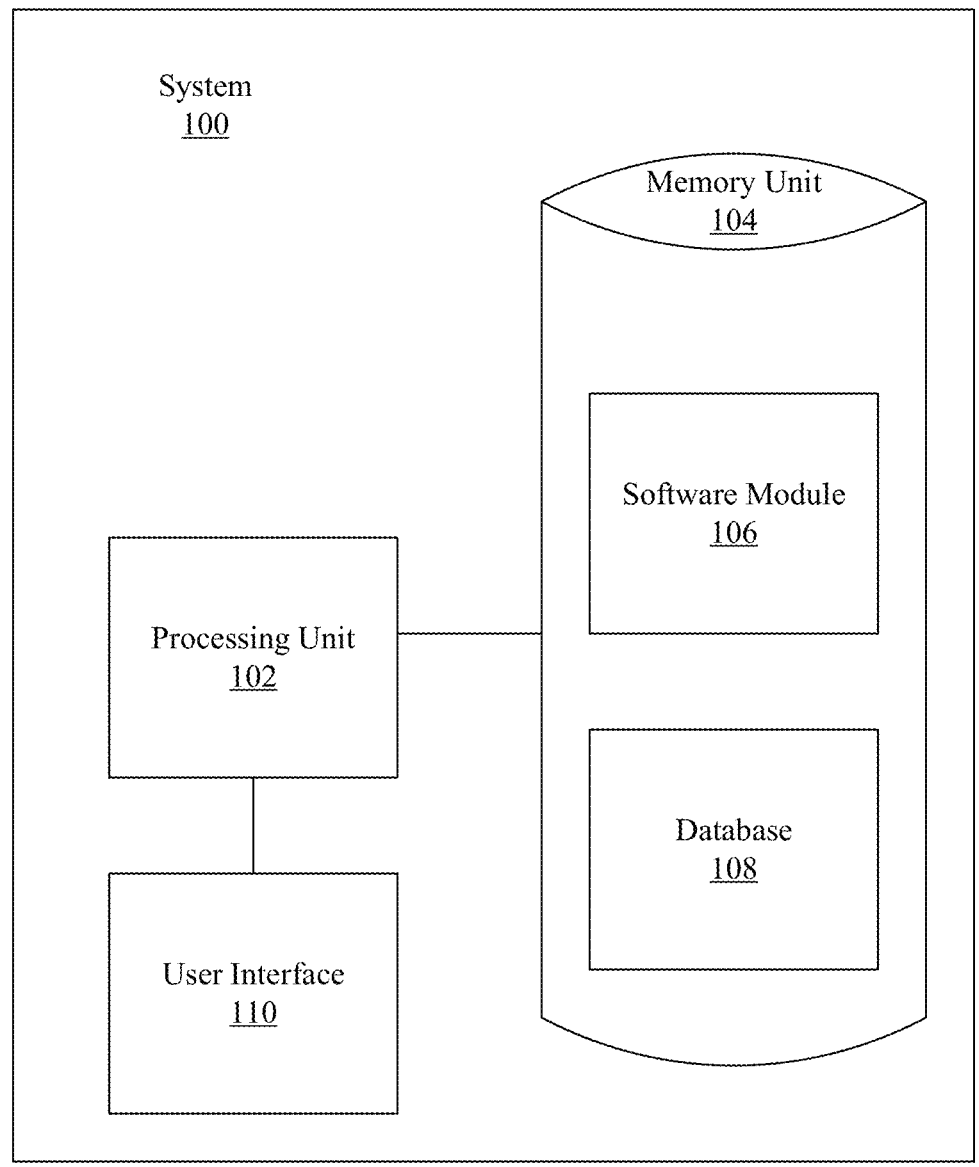
FIG. 1 shows a system for implementing a method for configuring a reel, according to an illustrative embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding operations to the disclosed methods. Accordingly, the following detailed description does not limit the invention.

Exemplary embodiments include a reel configurator application, or reel configurator app, that can be used to configure reels containing one or more conductors. For example, a user can use the reel configurator app to configure reels for use with various jobs. During the configuration, the user can create reels loaded with conductors for various circuits. For instance, the user can configure a first reel to have loaded thereon conductors for two circuit pulls and a second reel to have conductors loaded thereon for three circuit pulls. Once the reels are configured, the user can share the configurations with others and submit the configured reels to a supplier for a quote. Note that throughout this disclosure terms such as wire, cable, conductor, or any equivalent terms may be used interchangeable. A conductor may be any material that allows energy transmission through the material. Non-limiting examples of conductors include electrical wire and fiber optic cable.

The reel configurator application disclosed herein provides substantial advances to the current technology. Using the reel configurator as disclosed herein, a user is able to configure reels while being provided a visual representation of the various conductors to be installed on reels. For example, as the user is configuring reels using the reel configurator application as disclosed herein, the user is provided a visual representation showing the type of conductors (e.g., stranded v. solid conductors), the color of the sheathing covering the conductors (e.g., black, white, red, green, etc.), and the size of the conductors (e.g., 14 gauge, 12 gauge, 4/0, etc.) to be installed on the reels.

In addition to being provided with a visual representation of the various conductors, use of the reel configurator application as disclosed herein also provides the user with a visual representation of reels as they are being configured. For instance, as the user adds circuits, sometimes referred to as pulls, the user is provided with a visual representation, and thus is able to see, a visual representation of the circuit or circuits on a reel. As the user adds circuits, the visual representation of the reel is updated to show the circuit or circuits. Having the visual representation allows a user to visually confirm a configuration of a reel. For instance, during the configuration process the user can visually confirm that a desired configuration is possible. In other words, the visual representation provided to the user allows the user to visually confirm that the desired configuration is physically possible to build. For example, using the reel configurator application as described herein, the user is able to visually confirm that a desired amount (e.g., a specific number of feet of cable) of cable will physically fit onto a given reel. In addition, the user is able to visually confirm that a desired number of circuits will physically fit onto a given reel.

FIG. 1 shows a system 100 for implementing a reel configurator application as described herein. As shown in FIG. 1, the system 100 may include a processing unit 102 and a memory unit 104. The memory unit 104 may include a software module 106 and a database 108. The software module 106 includes instructions that, when executed by the processing unit 102, cause the processing unit to allow the user to configure reels as disclosed herein. The database 108 may comprise information about various projects, standard reel properties (e.g., reel dimensions and weight), wire properties (e.g., wire types, wire sizes, wire weight per foot), etc. While executing on the processing unit 102, the software module 106 may perform processes for configuring reels including, for example, one or more operations included in a method 200 described below with respect to FIG. 2.

The software module 106 may include various software and program modules to perform the various operations described herein. The software module 106 and other programs can be embodied in computer-readable media containing instructions that, when executed by the processing unit 102, perform various operations such as those described herein. According to embodiments, the software module 106 may be embodied in hardware, software, firmware, or any combination thereof.

By way of example, and not limitation, computer-readable media may include any available computer storage media or communication media that can be accessed by the system 100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 100. In the claims, the phrase "computer storage medium" and variations thereof do not include waves or signals per se and communication media.

The system 100 may also include a user interface 110. The user interface 110 allows the user to input information into the system 100 and view information.

The system 100 may comprise any computer operating environment, such as hand-held devices, multiprocessor systems, microprocessor-based or programmable sender electronic devices, minicomputers, mainframe computers, and the like. The system 100 may also be practiced in distributed computing environments where tasks are performed by remote processing devices. For example, the system 100 may be a server that is accessed by using a web browser such as Internet Explorer® or Safari®. Furthermore, the system 100 may comprise a mobile terminal, such as a smart phone, a cellular telephone, a cellular telephone utilizing wireless application protocol (WAP), a personal digital assistant (PDA), an intelligent pager, a tablet computer such as the iPad®, a portable computer, a hand held computer, or a wireless fidelity (Wi-Fi) access point. The aforementioned systems and devices are examples, and the system 100 may comprise other systems or devices.

Figure 2:
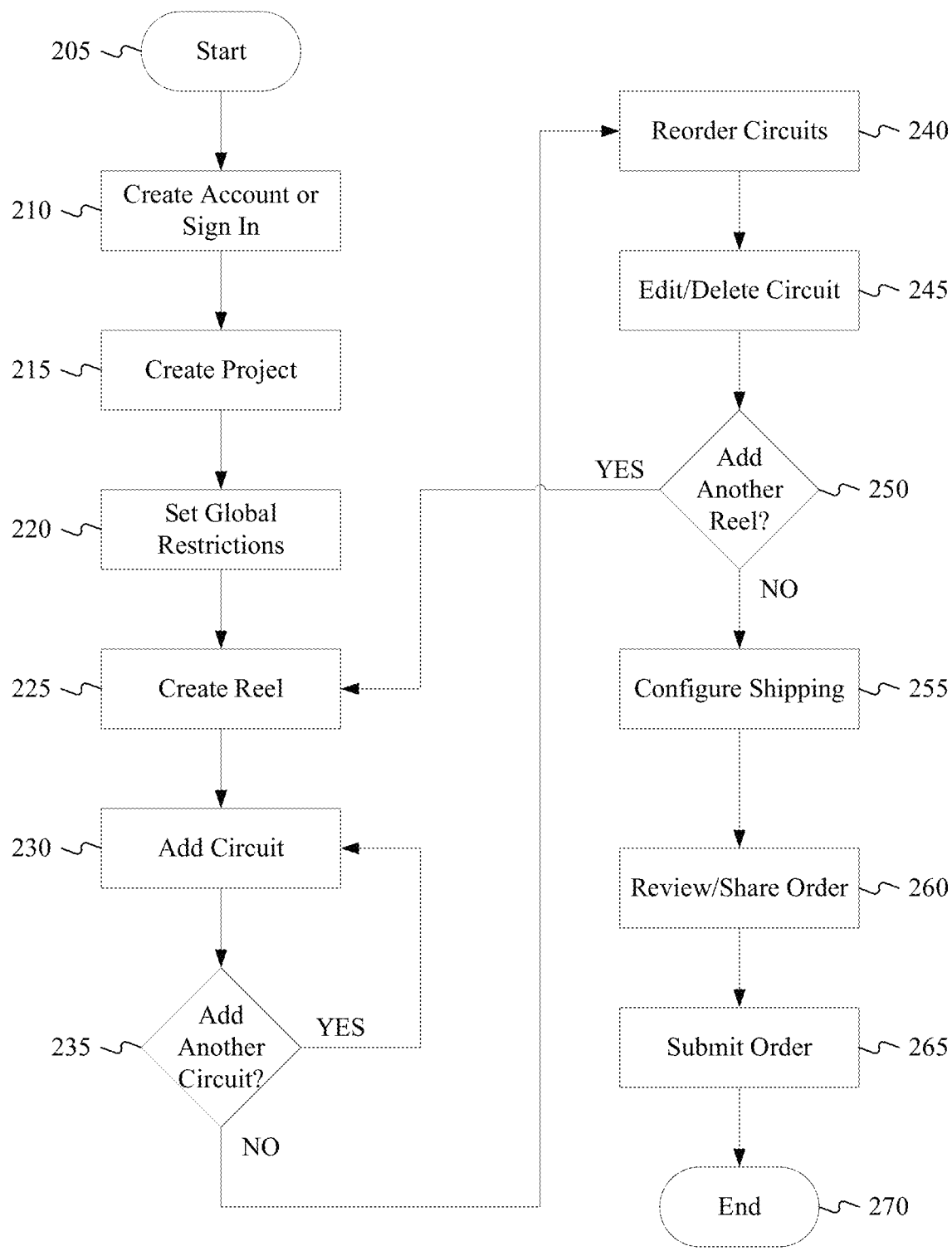
FIG. 2 shows a flowchart for the method for configuring the reel, according to an illustrative embodiment.

FIG. 2 is a flow chart setting forth the general operations involved in the method 200 for configuring a reel. The method 200 may be implemented using, for example, the system 100 as described in more detail above. Ways to implement the operations of the method 200 will be described in greater detail below.

Figure 3:
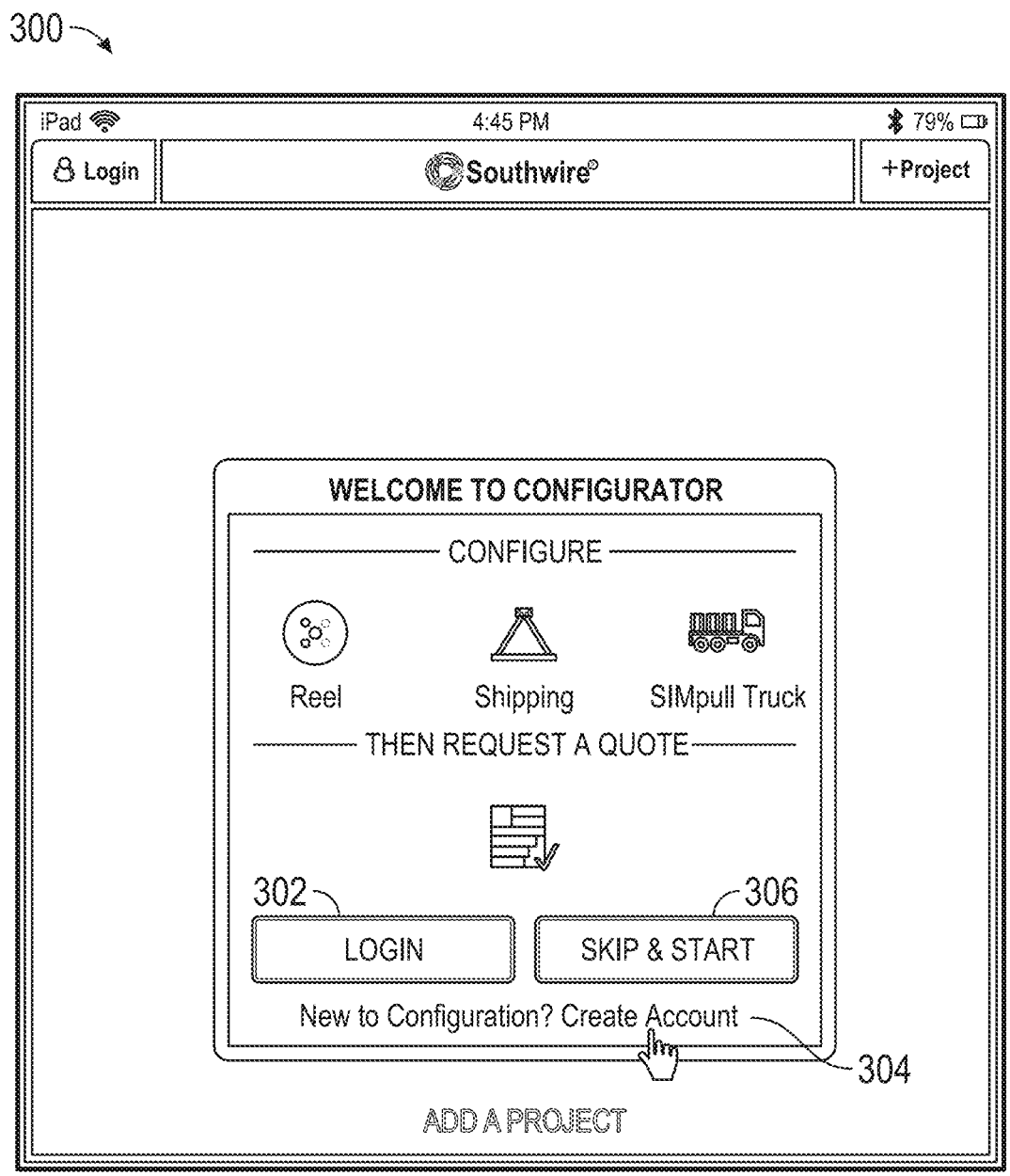

The method 200 may begin at starting block 205 and proceed to operation 210 where, using the system 100, a user may login or create an account. For example, as shown in FIG. 3, a user may be presented with a login screen 300. Using the login screen 300, the user may login by pressing a login button 302 or may create an account by selecting a link 304. In addition, the user may skip the login process and begin using the reel configurator application. In other words, the user does not have to be logged in to use the reel configurator application. As shown in FIG. 3, the user can select a skip & start button 306 to begin using the reel configurator application without logging in. When the user chooses to use the reel configurator application without logging in, certain features of the reel configurator application may be disabled. For instance, the user may not be able to send a reel solution or order to a supplier, manufacturer, or distributor for a quote.

Figure 4:
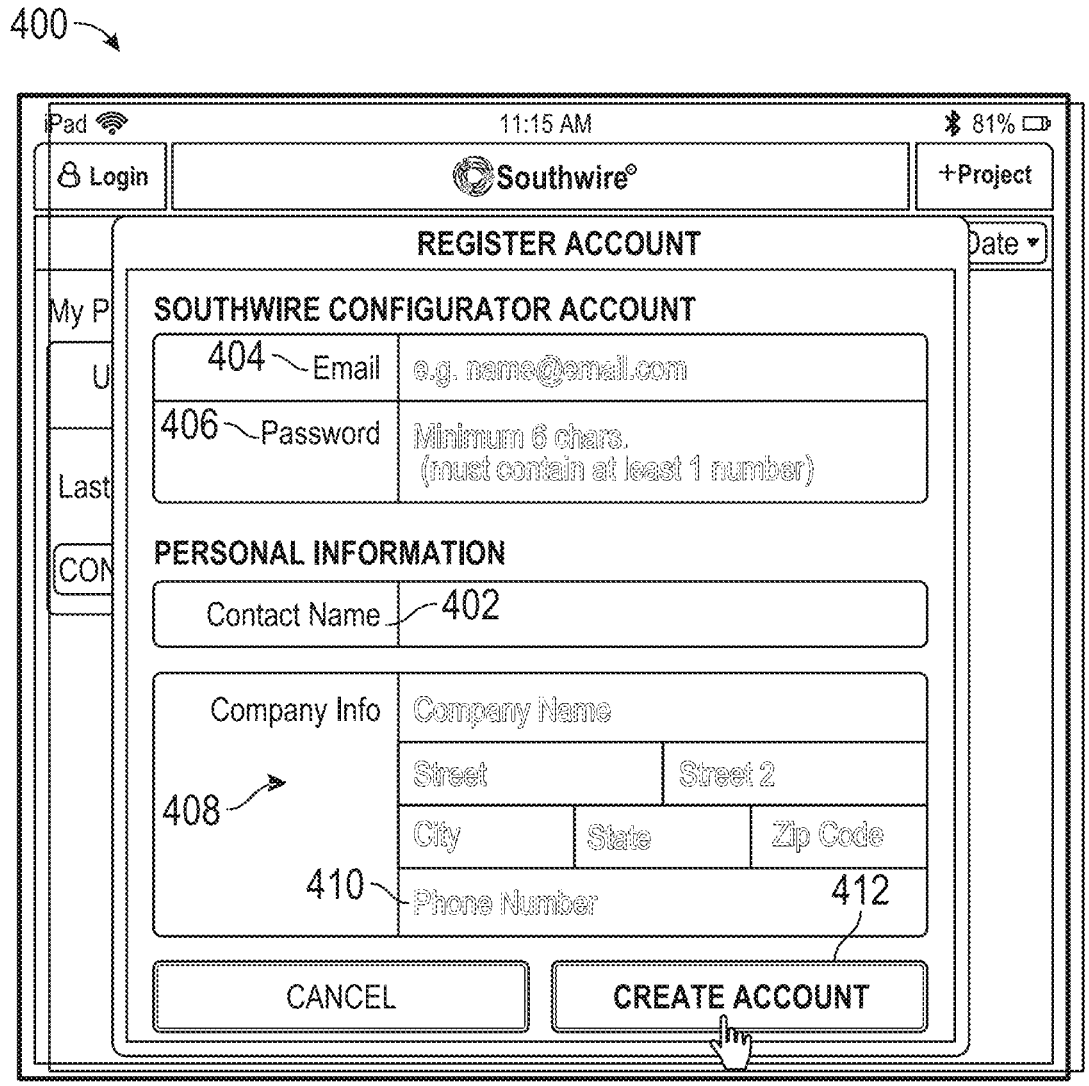

If the user is new to the reel configurator application and selects the link 304 to create an account, a create account screen 400, such as shown in FIG. 4, may be provided. The create account screen 400 allows the user to create an account. For example, to create an account the user may provide information such as a contact name 402, an email address 404, a password 406, and company information such as a company name and mailing address 408 and a phone number 410.

Consistent with embodiments, the user's email address may act as a user name, or the user may be prompted to create a user name (not shown). Once the information is provided, the user may select the create account button 412 to create his or her account.

Figure 5:
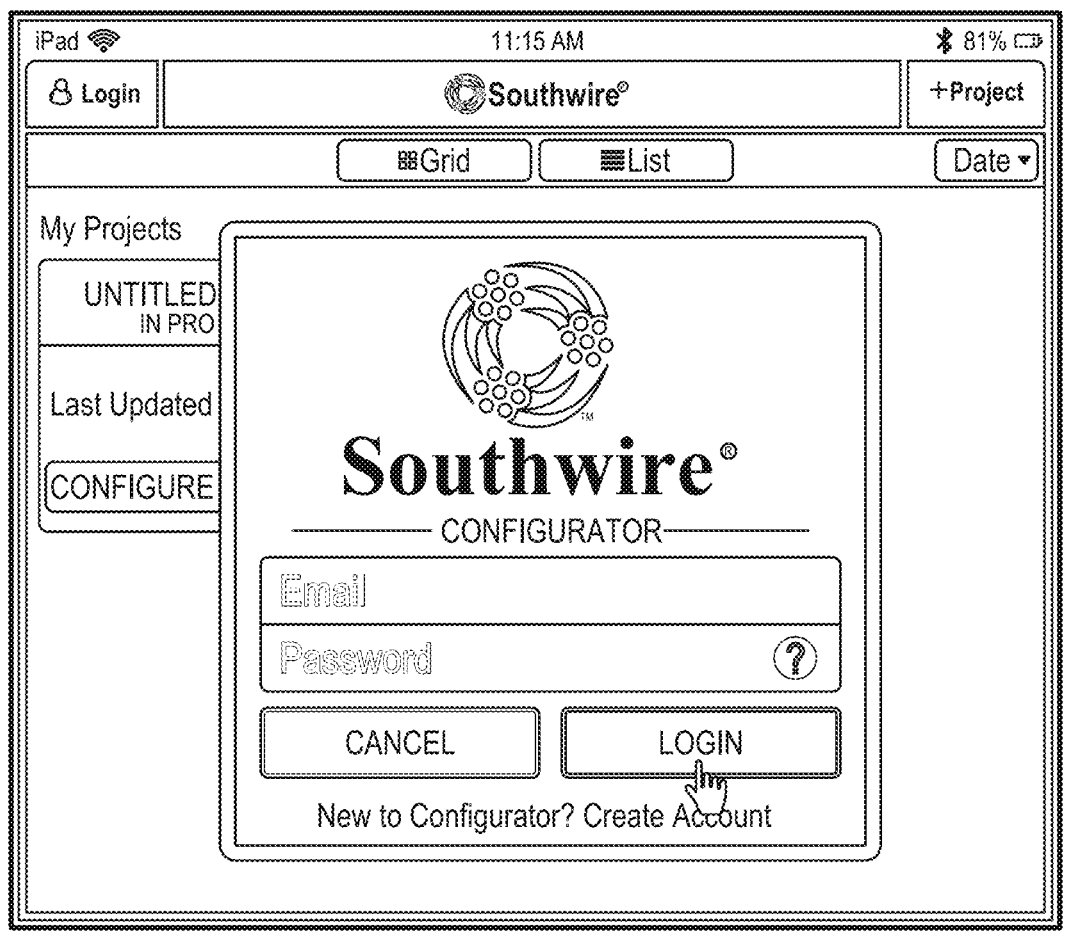
Figure 6:
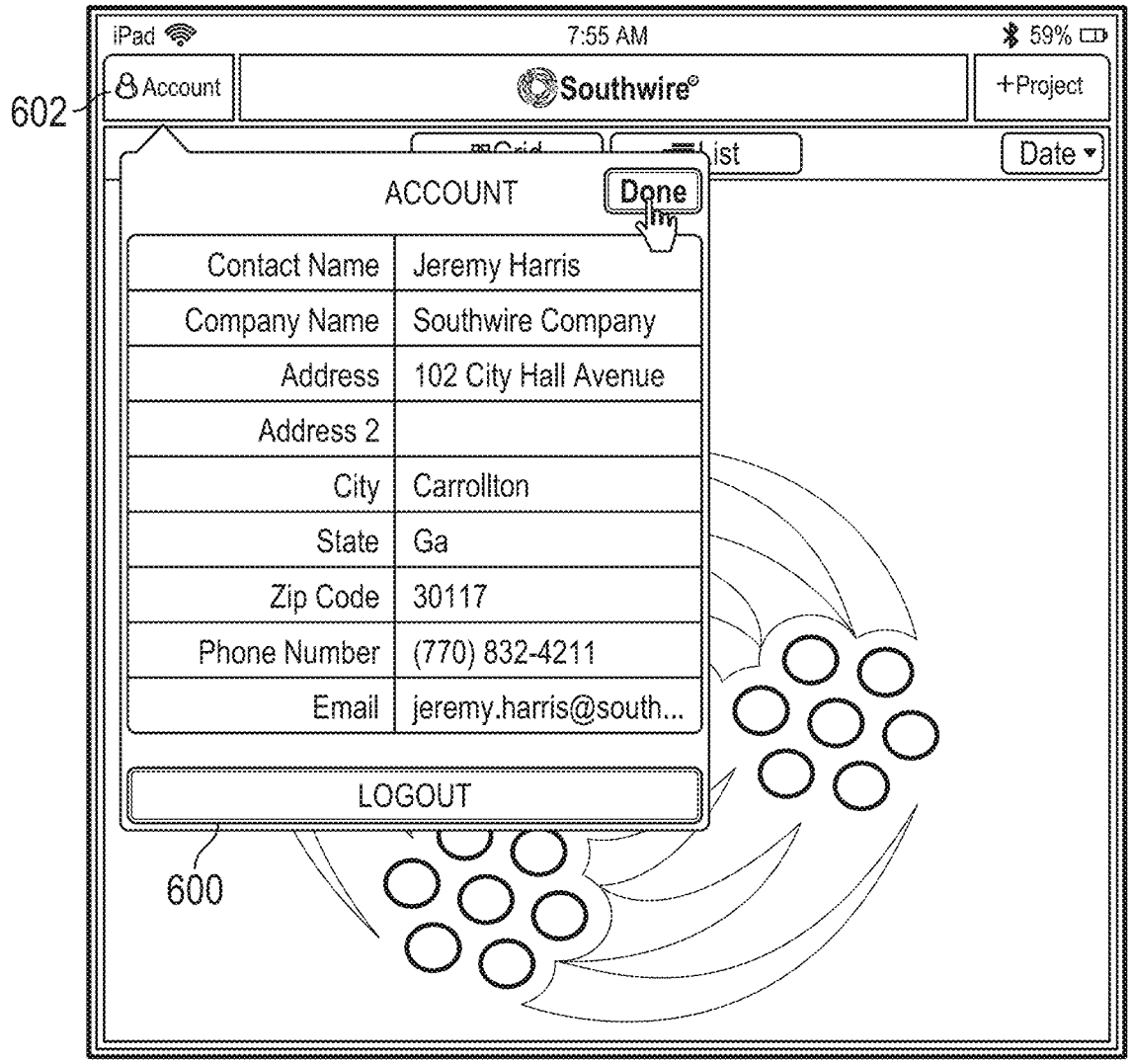

After creating an account as discussed above, or in response to the user selecting the login button 302, the user is presented with a login screen 500, as shown in FIG. 5, for entering the user's user name, which may be the user's email address, and for entering the user's password. Consistent with embodiments, the user may stay logged in, regardless of whether the reel configurator application is closed, until he or she selects a logout button 600, as shown in FIG. 6. According to an illustrative embodiment, the logout button 600 may be provided upon selection of an account button 602 provided by the reel configurator application. In addition, once the user has created his or her account, the account details associated with the user can be edited by selecting the account button 602. As illustrated in FIG. 6, in response to selecting the account button 602, the current account details may be displayed. The user can then directly edit the account details.

Figure 7:
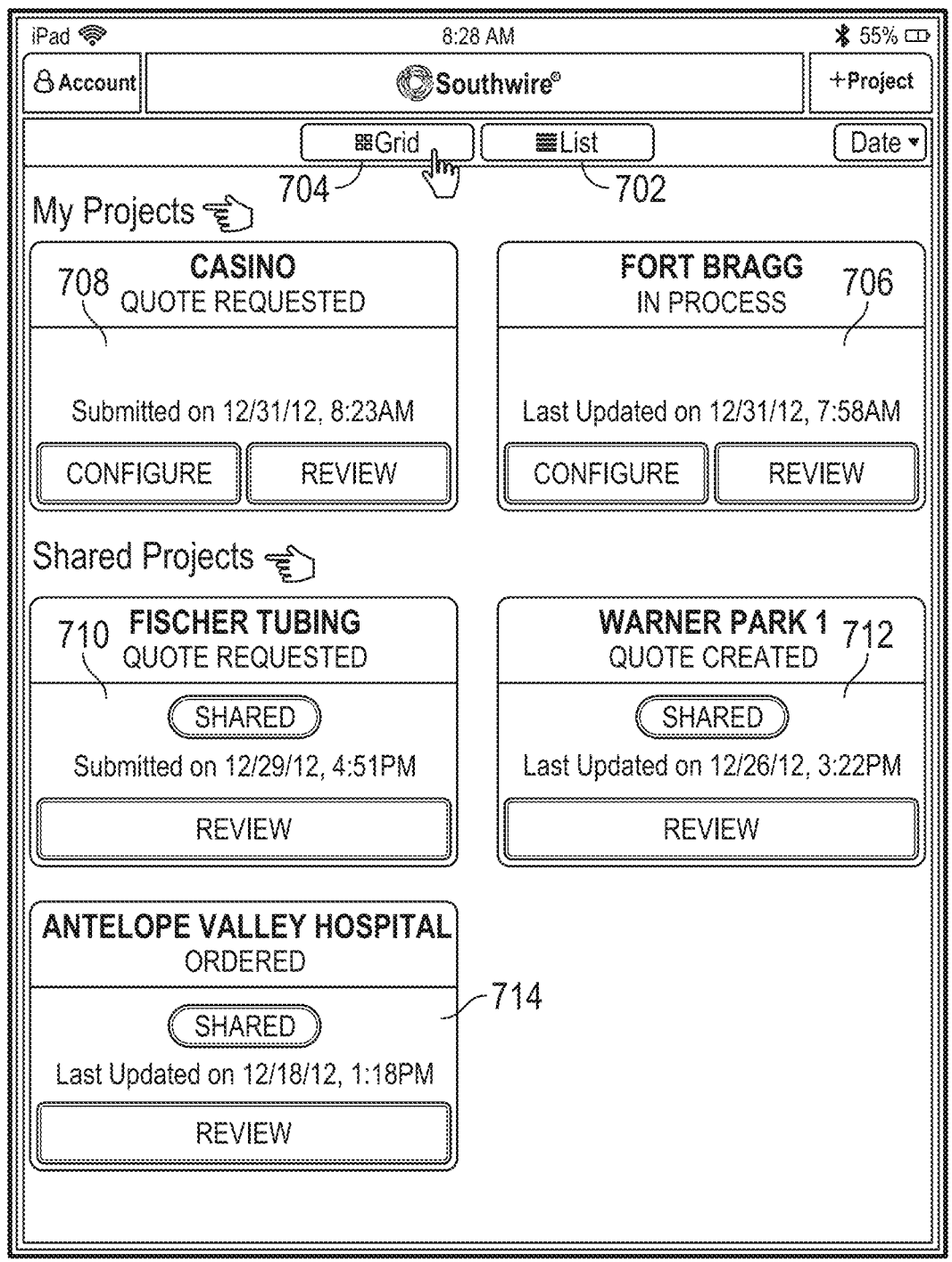
Figure 8:
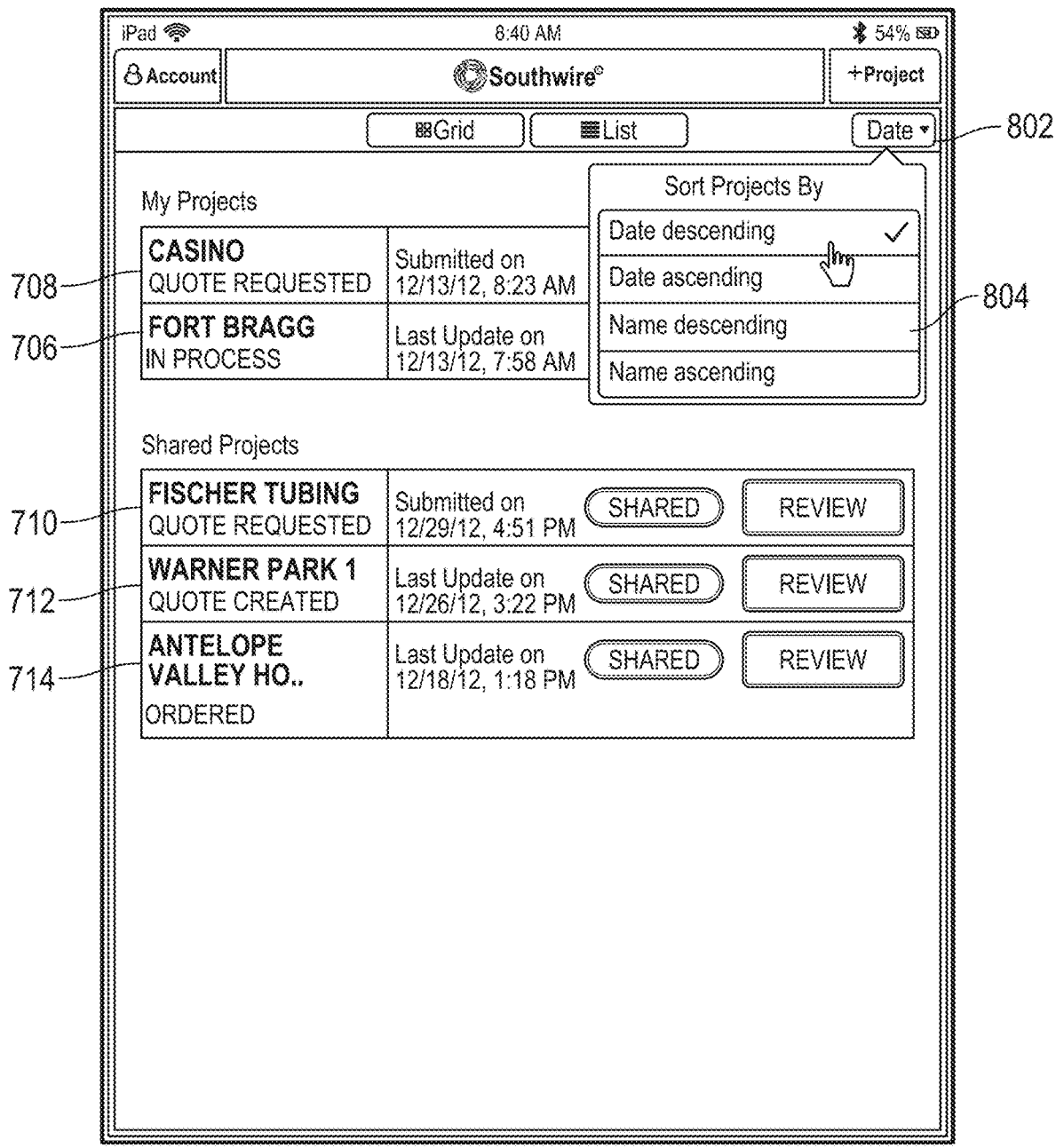

Once the user has logged in to the reel configurator application, a home screen 700, as shown in FIG. 7, may provide a list of various projects 706, 708, 710, 712, and 714 that the user has created using the reel configurator application. The various projects 706, 708, 710, 712, and 714 may be displayed in a list format, as illustrated in FIG. 8, using a list button 702 or a grid format, as illustrated in FIG. 7, using a grid button 704. In addition, the various projects 706, 708, 710, 712, and 714 may be grouped according to various parameters. For example, as shown in FIG. 7, the various projects 706, 708, 710, 712, and 714 may be grouped under a "My Projects" category (i.e., projects created by a specific user) or a "Shared Projects" category (i.e., projects other users have shared with the user). Other parameters for grouping projects include, but are not limited to, potential suppliers, a date the project is to begin, estimated project costs, and project locations. Permissions associated with each of the various projects 706, 708, 710, 712, and 714 may depend on which category each of the various projects 706, 708, 710, 712, and 714 is grouped. For example, projects shared with the user (i.e., "Shared Projects") may be available for review only. Projects the user has shared, or "My Projects," may be reviewable and editable by the user, but not by users with whom the user has shared projects.

In addition, the various projects 706, 708, 710, 712, and 714 may be color coded to illustrate what stage of processing each of the various projects 706, 708, 710, 712, and 714 is in for easier identification. For example, an "in process" project, such as the various project 706, may have a grey, or other first default, coloring. Projects where a quote has been requested, such as the various projects 708 and 710, may have a purple, or other second default, coloring. Projects in which a quote has been created, such as various project 712, may have a blue, or other third default, coloring. Projects where one or more configured reels have been ordered, such as the various project 714, may have a cyan, or other fourth default, coloring. The user, using a preferences screen (not shown), may set the various default colors for the different stages of processing.

The various stages are used by the user during creation and customization of reels for the various projects 706, 708, 710, 712, and 714. For instance, in the initial planning for a project a user may create one or more reels. As more details of the project become known, the user may create new reels, delete reels, and customize reels by adding and deleting circuits as well as changing the order of circuits on reels.

As shown in FIG. 8, the various projects 706, 708, 710, 712, and 714 can be sorted using a variety of criteria. For example, upon the user selecting a sort button 802, a popup window 804 may be provided allowing the various projects 706, 708, 710, 712, and 714 to be sorted by date (ascending or descending) or name (ascending or descending). The name of the sort button 802 may change depending on the sorting criteria. For example, if the user selects "name descending," the text within the sort button 802 may change from "date" to "name."

Figure 9:
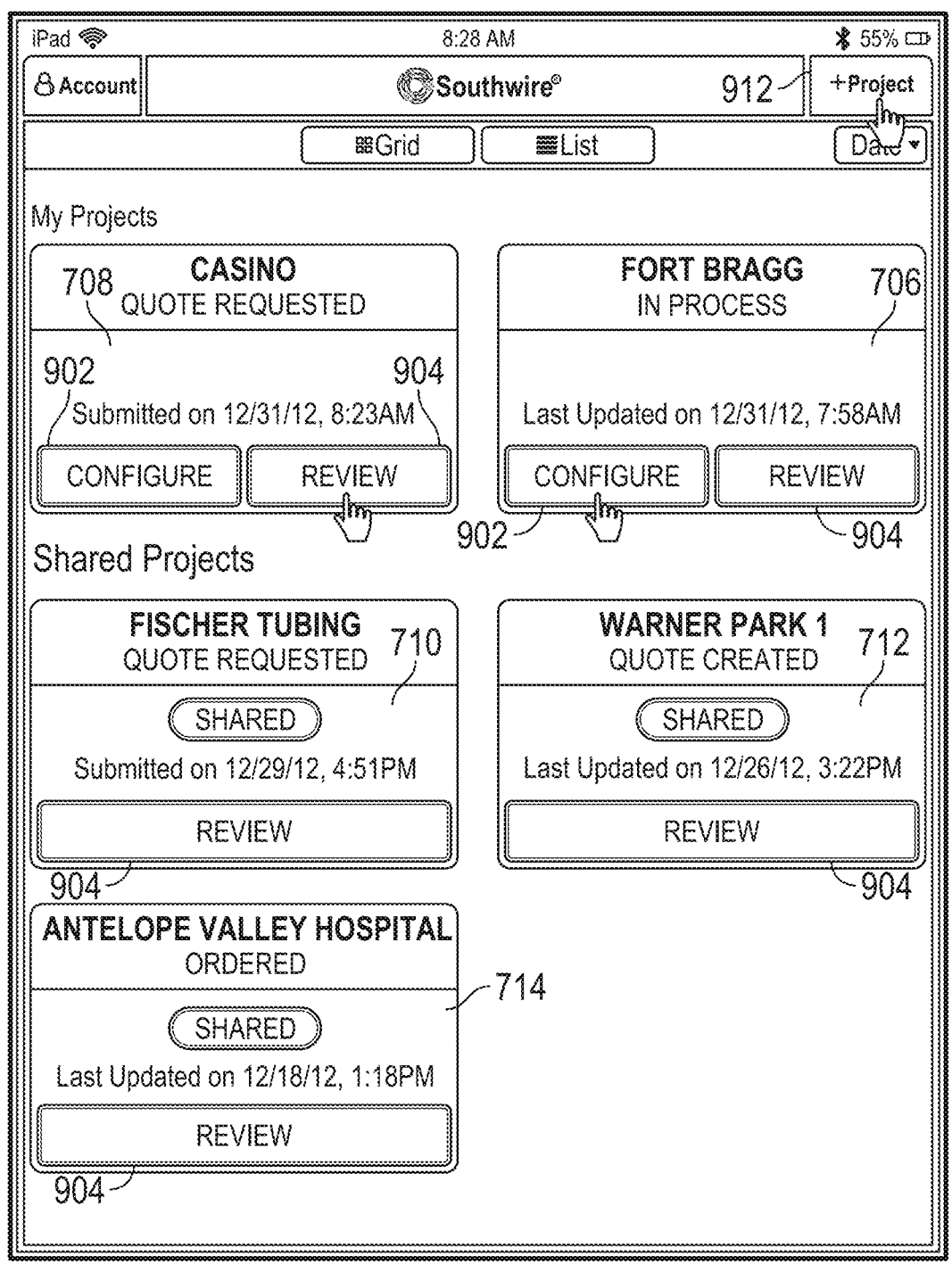

Turning now to FIG. 9, from the home screen 700 where the various projects 706, 708, 710, 712, and 714 are displayed, the user may review only or review and configure the existing various projects 706, 708, 710, 712, and 714 by selecting a review button 904 or a configure button 902. For example, when the review button 904 is selected, the user is only allowed to view the current reel configurations for a project, such as the project 706. When the user selects the configure button 902, the user may alter the project 706 by adding and deleting reels as well as adding circuits to existing reels and rearranging the order of circuits on existing reels as disclosed herein. According to an illustrative embodiment, the various projects 706 and 708 grouped under the "My Projects" category are associated with both the review button 904 and the configure button 902. The "My Projects" category includes the configure button 902 because the projects 706 and 708 grouped under the "My Projects" category were created by the user and thus the user can alter the configuration of reels associated with the projects 706 and 708. The projects 710, 712, and 714 grouped under the "Shared Projects" category (i.e., projects shared with the user) may only be associated with the review button 904 to allow the user to review the projects 710, 712, and 714. The projects 710, 712, and 714 include only the review button 904 because the "Shared Projects" category includes projects created by other users that have been shared with the user logged into the reel configurator app and thus, are only reviewable by the user.

Figure 10:
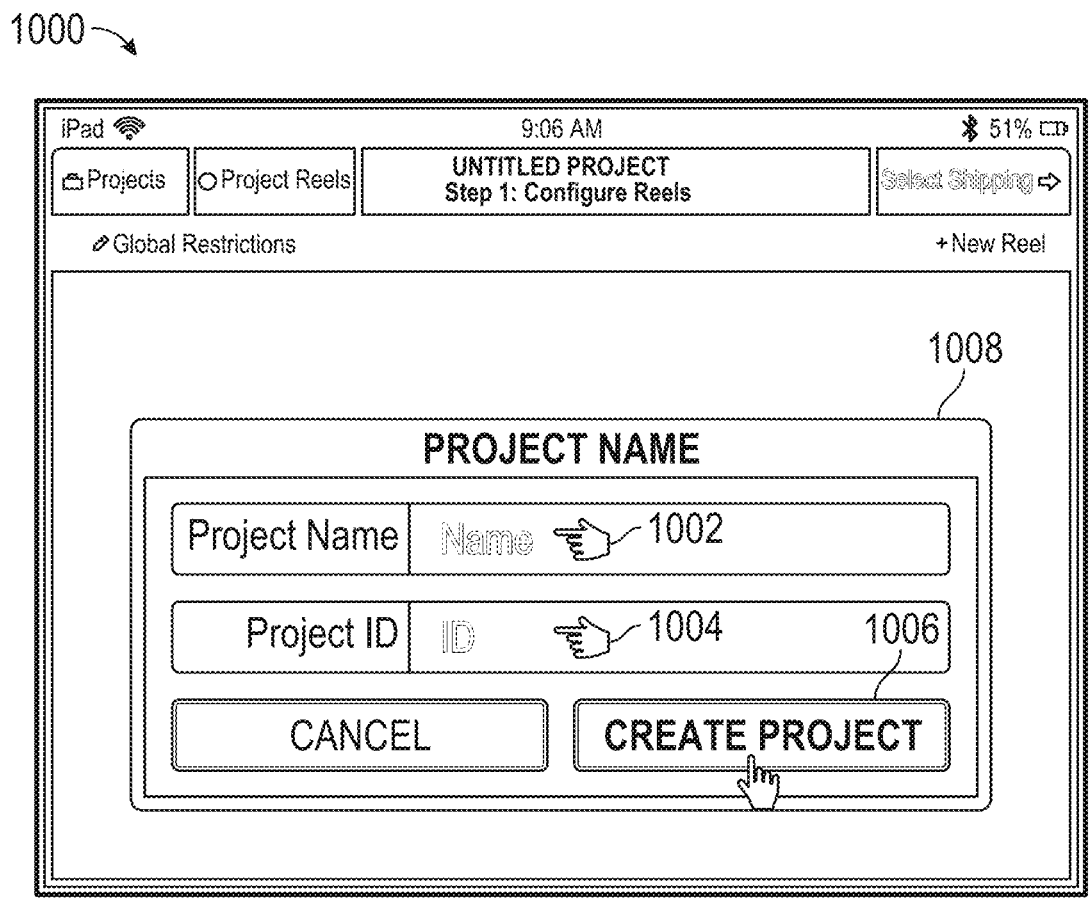

Referring back to FIG. 2, from operation 210 where the user logs in, the method 200 proceeds to operation 215 where the user uses the reel configurator application to create a project. For example, as shown in FIG. 9, the user may create a new project by selecting on a new project button 912. A new project includes a project for which the user wishes to order reels of conductors. For instance, the user may create a new project for a new job the user has been awarded or for an existing job that requires additional reels of conductors. Once the user has selected the new project button 912, a project creation window 1000, as shown in FIG. 10, may be provided. Using the project creation window 1000, the user provides information for the new project in a project information window 1008. For example, a project name 1002 and a project ID 1004 may be provided in the project information window 1008. While not shown, in various embodiments, additional information about the project may also be provided. For instance, the address associated with the project, the customer name associated with the project, the person responsible for the project, etc., may be provided. Once the information is provided, the user selects the create project button 1006 to create the new project.

Figure 11:
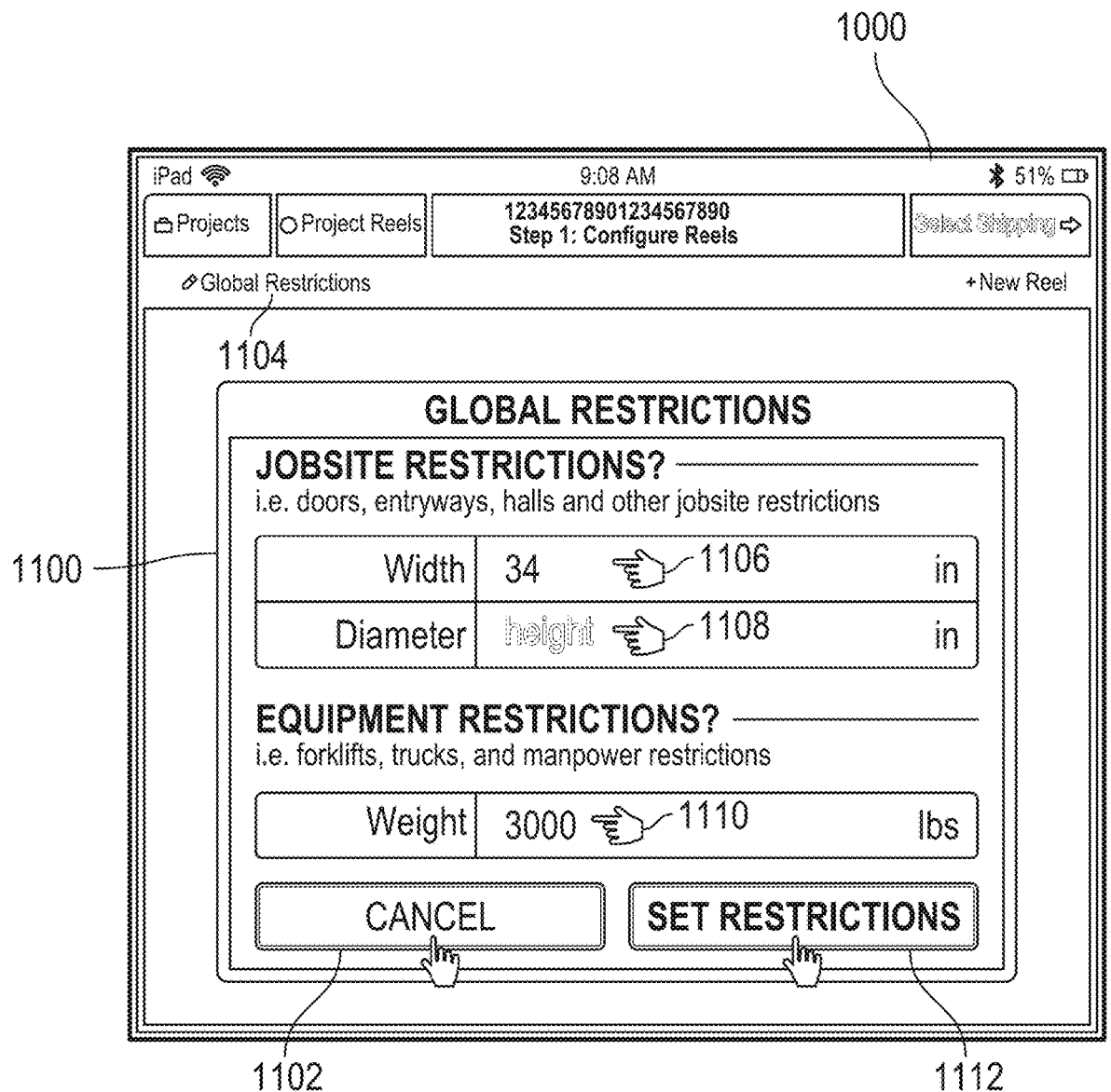

Referring back to FIG. 2, from operation 215 where the project is created, the method 200 proceeds to operation 220 where global restrictions associated with the project can be set. For example, as shown in FIG. 11, the user can set global restrictions for the project using global restrictions window 1100. The global restrictions window 1100 may be provided in response to the user selecting the create project button 1006 of FIG. 10. If the user does not wish to create global restrictions, the user may select a cancel button 1102 provided on the global restrictions window 1100 to close the global restrictions window 1100. In addition, the global restrictions window 1100 may be provided in response to the user selecting the create project button 1006 of FIG. 10, and, instead, the user can open the global restrictions window 1100 by selecting a global restrictions button 1104 provided on the project creation window 1000.

Using the global restrictions window 1100, limitations created by a jobsite where the project will be used that impact the project may be entered. For instance, a maximum width 1106, a maximum diameter/height 1108, and a maximum weight 1110 of a reel may be entered. The global restrictions relate to physical limitations associated with a jobsite. For example, the doors at the jobsite of the project may be 36 inches. While creating the project, the user may specify that the largest reel width can only be up to 34 inches to insure that any ordered reels for the project will fit through the doorways at the jobsite. The user may specify that the maximum weight a forklift at the jobsite can handle or that the floors can support is 3,000 pounds, and thus the maximum weight for any reel associated with the project is 3,000 pounds. According to an illustrative embodiment, any restrictions entered as global restrictions will constrain all reels created for the project. This allows the user to have to enter any jobsite restrictions for the project only once. Once the global restrictions are set, the user may select a set restrictions button 1112 provided by the global restrictions window 1100 to set the global restrictions. According to an illustrative embodiment, global restrictions do not have to be set by the user every time a new project is created. For example, the various fields provided by the global restrictions window 1100 may populate with default settings, or the user may choose to leave the various fields blank. The default settings may be the last settings entered into the various fields by the user, or the default settings may be the settings the user entered when creating his or her account.

Figure 12:
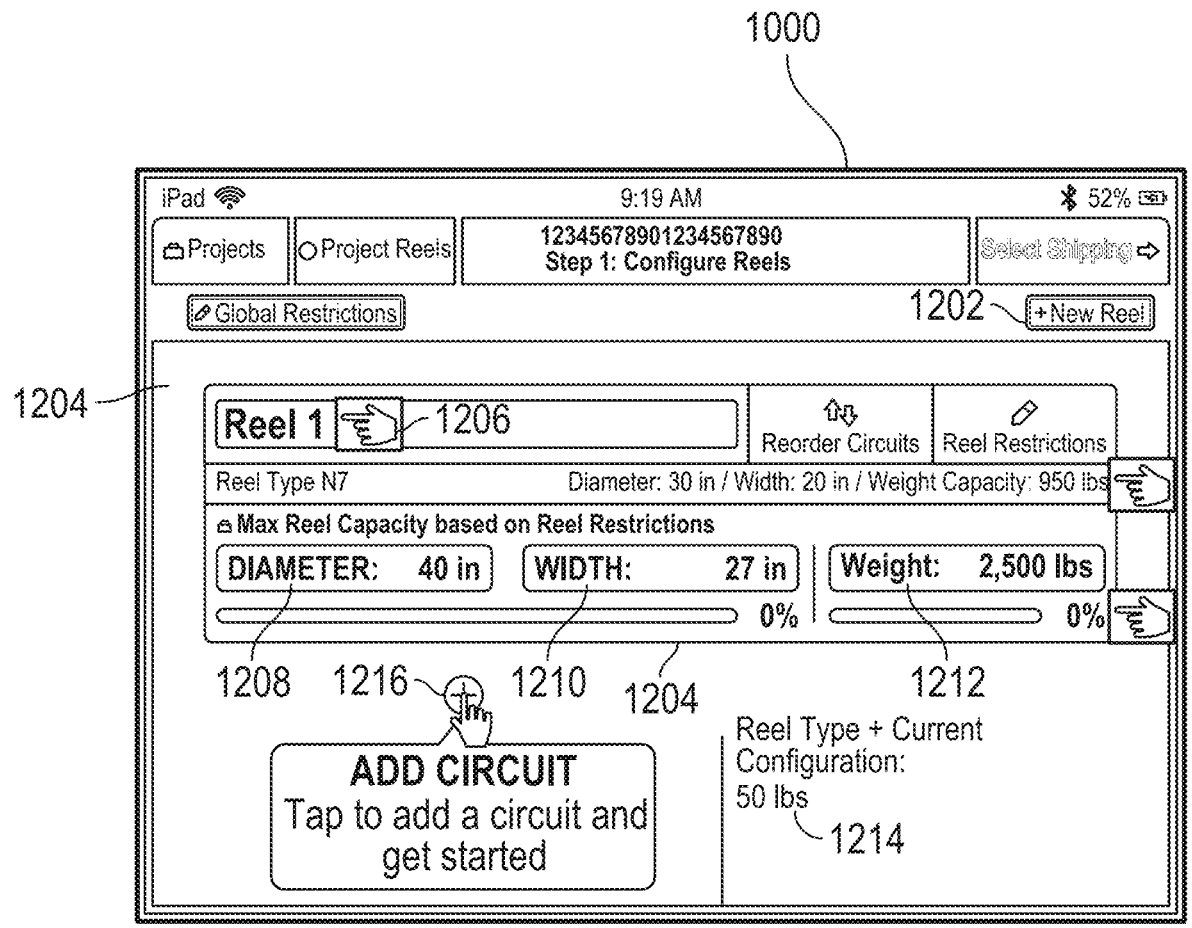

Referring back to FIG. 2, from operation 220 where the global restrictions are set for the project, the method 200 proceeds to operation 225 where a reel is created using the reel configurator application. For example, as shown in FIG. 12, the user selects a new reel button 1202 provided by the project creation window 1000 to create a new reel, and, in response to the selection of the new reel button 1202, a reel window 1204 is provided. As shown in FIG. 12, the user may be prompted to provide a reel name in text box 1206 provided by the reel window 1204. The user may name the reel, or a default name (e.g., Reel 1) may be used. In addition to the reel name, various information about the reel may be displayed automatically, without requiring the user to input the various information. For example, a diameter 1208, a width 1210, and a weight 1212 of the reel are displayed along with percentages of the values, which are explained further below in reference to FIG. 17. By default, the diameter 1208 and the width 1210 may be set as the largest possible reel available that fits within the global restrictions set using the global restrictions window 1100, and the weight 1212 may be set as the largest possible amount that the reel can weigh when loaded with wire, cable, circuits, etc., based on the global restrictions set using the global restrictions window 1100. Other information 1214, such as the current weight of the reel as configured, may be displayed. For instance, a newly created reel based on the diameter 1208 and the width 1210 with no wire or cable loaded on the reel may weigh 50 pounds. Using the reel information, the user can see if a reel is close to capacity or if there is room for other circuits to be added to the reel. For example, if a particular reel is configured with conductors such that the weight of the reel is only 50% of the global restriction weight, the user can determine if additional circuit can be added based on an estimated length of the additional circuit. For instance, if the reel is currently configured with 1,500 pounds of conductor, the maximum weight for the reel is 3,000 pounds, and the user estimates that two additional pulls for the job will only add 1,000 pounds to the reel, then the user can add the two additional pulls to the reel.

The user may configure the reel. For instance, the user may select the diameter 1208 and select a reel diameter from a dropdown list of standard reel sizes. The drop down list may be a list of all standard reel sizes or may be a list of only reel sizes that are within the global restrictions. The user may also select the width 1210 to adjust the width of the reel in a similar fashion as the diameter was selected. The weight of the reel may auto-populate based on the reel's diameter and width, as well as the conductors loaded onto the reel, as will be explained further below with reference to FIGS. 2 and 13.

Figure 13:
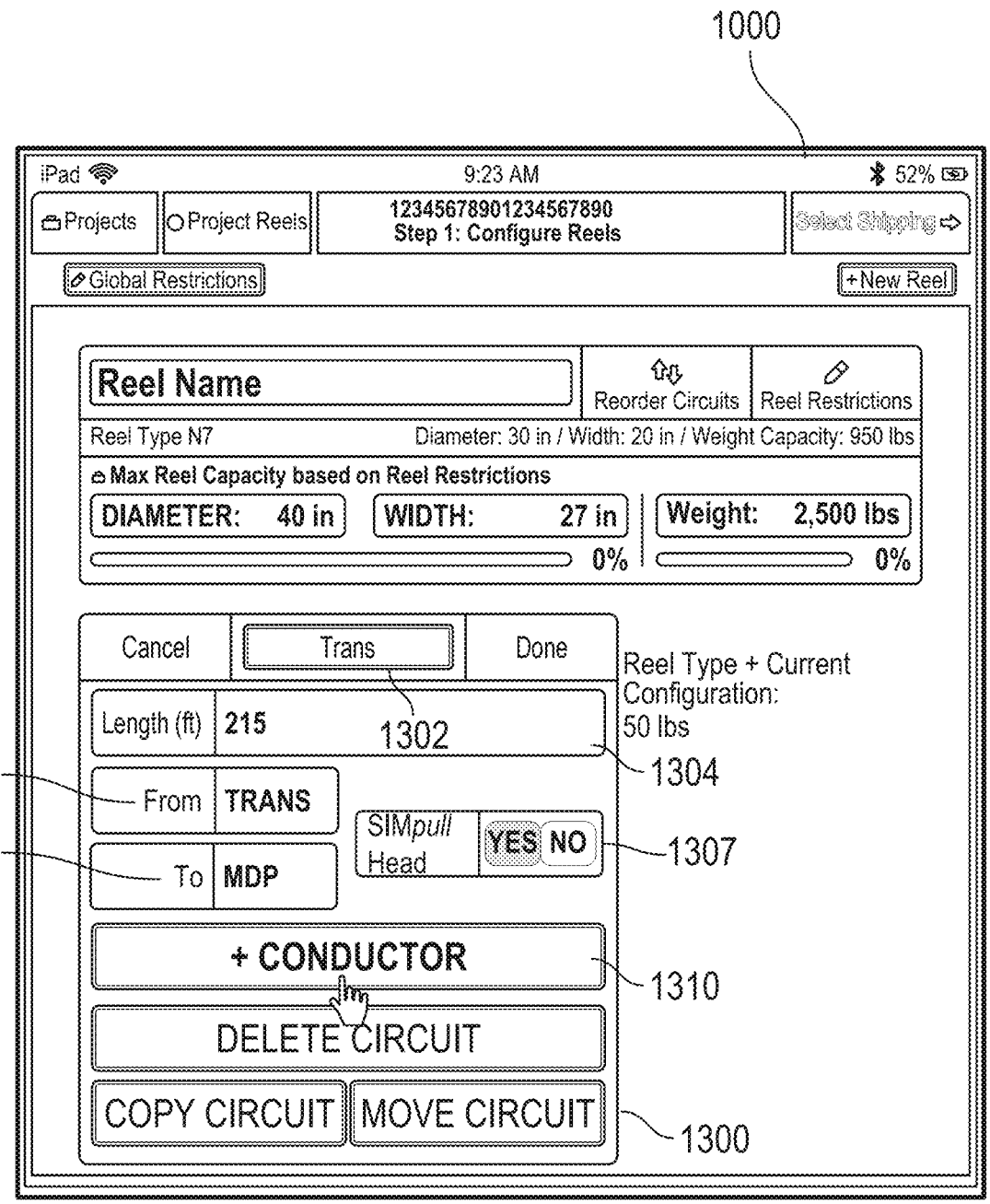

Referring back to FIG. 2, from operation 225 where the reel is created, the method 200 proceeds to operations 230 where one or more circuits to be loaded on the reel are added. To add a first circuit to be loaded on the reel, the user selects a "+" button 1216 provided by the reel window 1204 illustrated in FIG. 12. Once the "+" button 1216 is selected, a feeder window 1300, as illustrated by FIG. 13, is provided. According to exemplary embodiments, the feeder window 1300 provides the reel information established using the reel widow 1204. In addition, using the feeder window 1300, the user may enter a name for the first circuit (e.g., "Trans") in a circuit name field 1302, provide a length for the first circuit (e.g., 215 ft.) in a circuit length field 1304, and designate a starting location (e.g., "TRANS") using a starting location field 1306 and a termination location (e.g., "MDP") using a termination location field 1308. The starting location may be a transformer, a junction box, or any other identifiable location on a jobsite. The termination location may be a transfer, a junction box, or any other identifiable location to be connected to the starting location by the conductors.

In addition, project creation window 1000 may include a selection field 1307 to allow the user to further customize a circuit. For example, the selection field 1307 may allow a user to select whether or not the circuit includes SIMpull® pulling heads. For instance, the user may not have the tools to install SIMpull® pulling heads and therefore may elect to have the SIMpull® pulling heads installed at the factory. Furthermore, additional selection fields may be included. For instance, a second selection field (not shown) may allow a user to select whether or not the conductors in a circuit are banded together.

Figure 14:
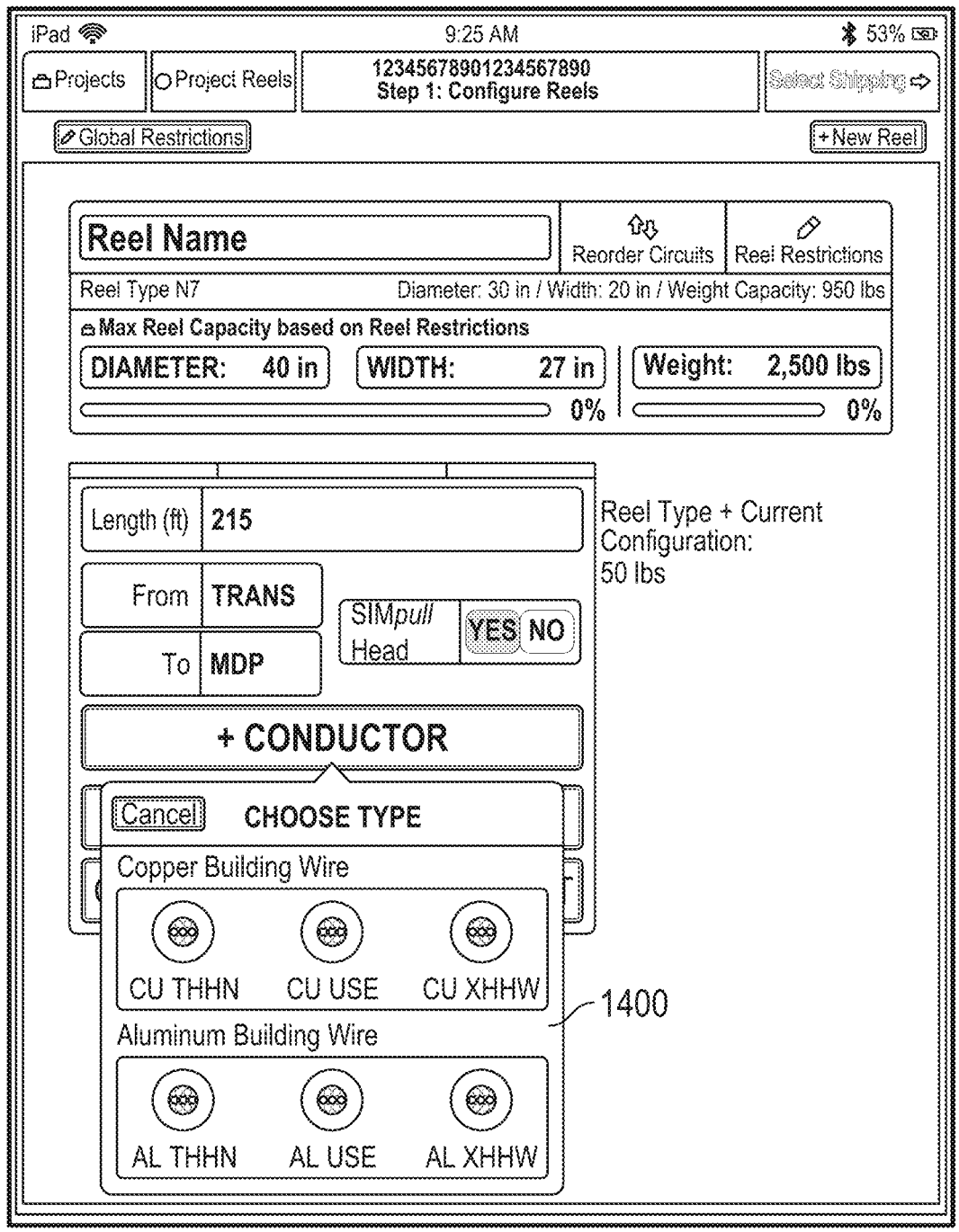
Figure 15:
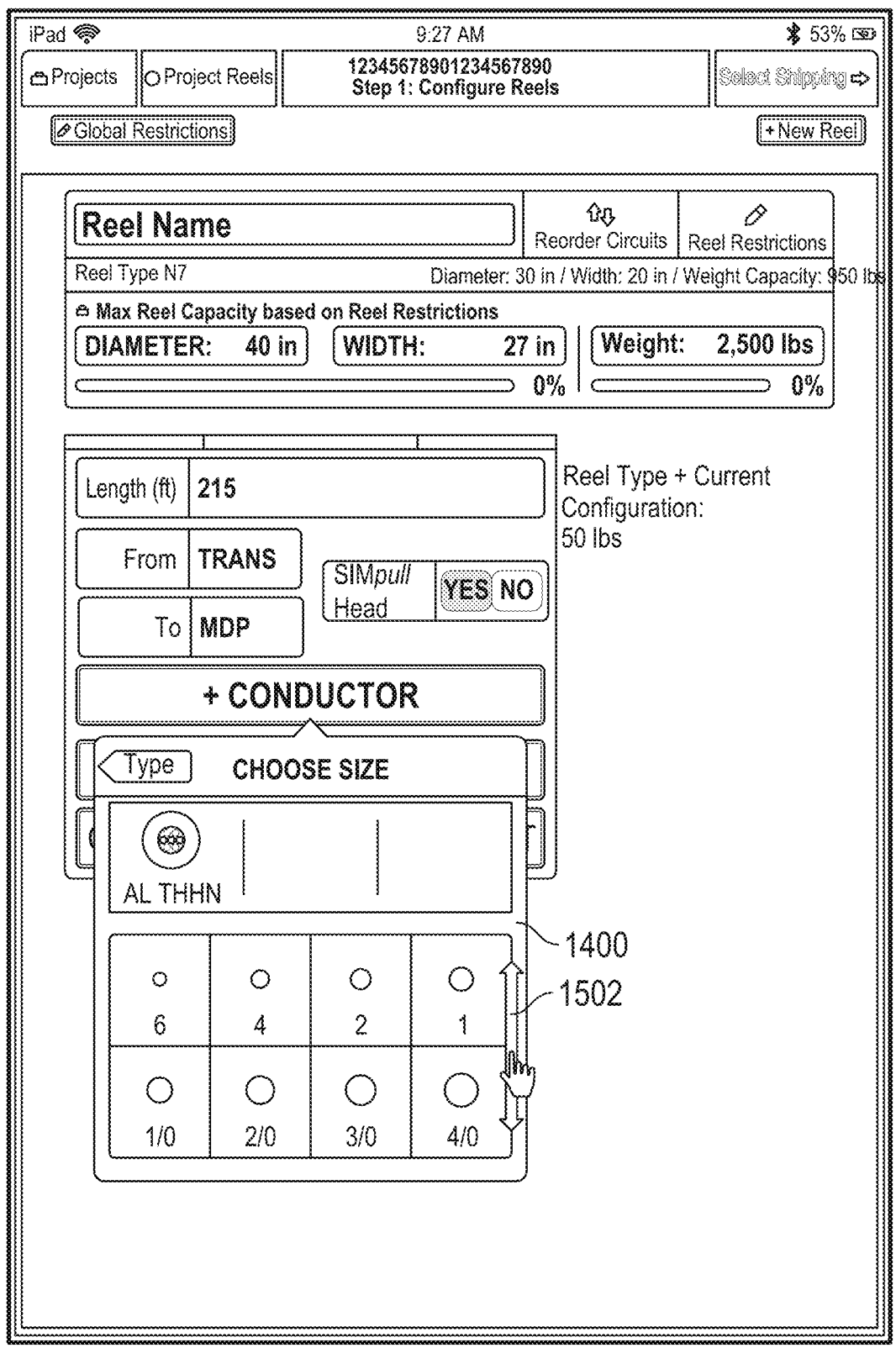

Once identification information for the first circuit is entered using the feeder window 1300, the user may add parameters associated with the first circuit by selecting a "+ conductor" button 1310. After the user selects the "+ conductor" button 1310, a conductor type window 1400, as illustrated by FIG. 14, may be provided, and the user may be prompted to select a conductor type for the first circuit. From the conductor type window 1400, the user may select from a variety of standard conductor types. For example, the user may select between aluminum and copper conductors, solid cable and stranded cable, etc. Once the user has selected a conductor type using the conductor type window 1400, options within the conductor type window 1400 can change, as illustrated by FIG. 15, to prompt the user to select a conductor size of the conductor type selected. The listing of conductor types and the conductor sizes may be large and may only be partially displayed by the conductor type window 1400. Thus, the user may have to scroll the listing of conductor types and the conductor sizes using a scroll bar 1502 to find the desired conductor type and conductor size. For example, the user may select from a 6 AWG cable, or the user may scroll down to select a 5/0 AWG cable.

Figure 16:
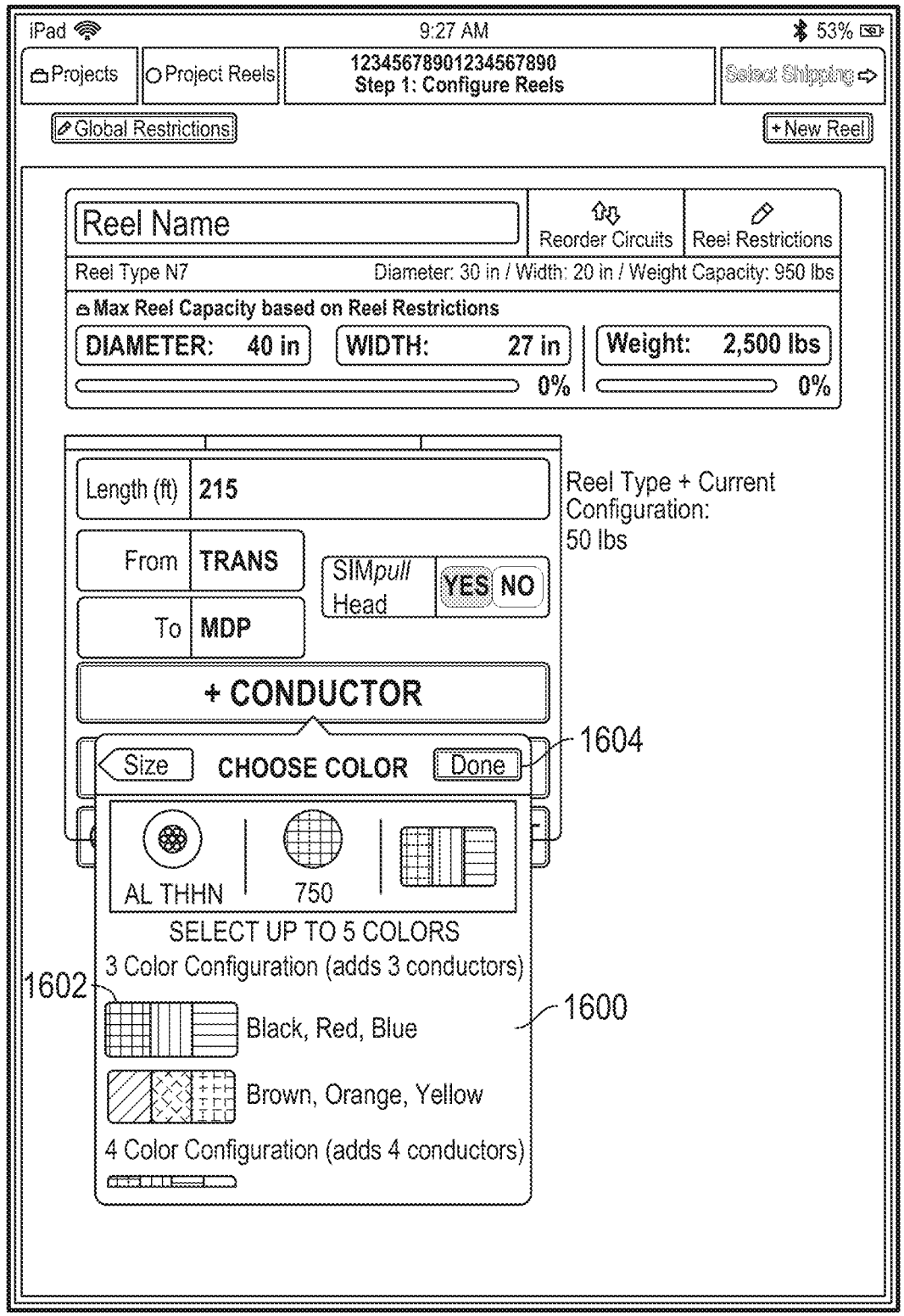
Figure 17:
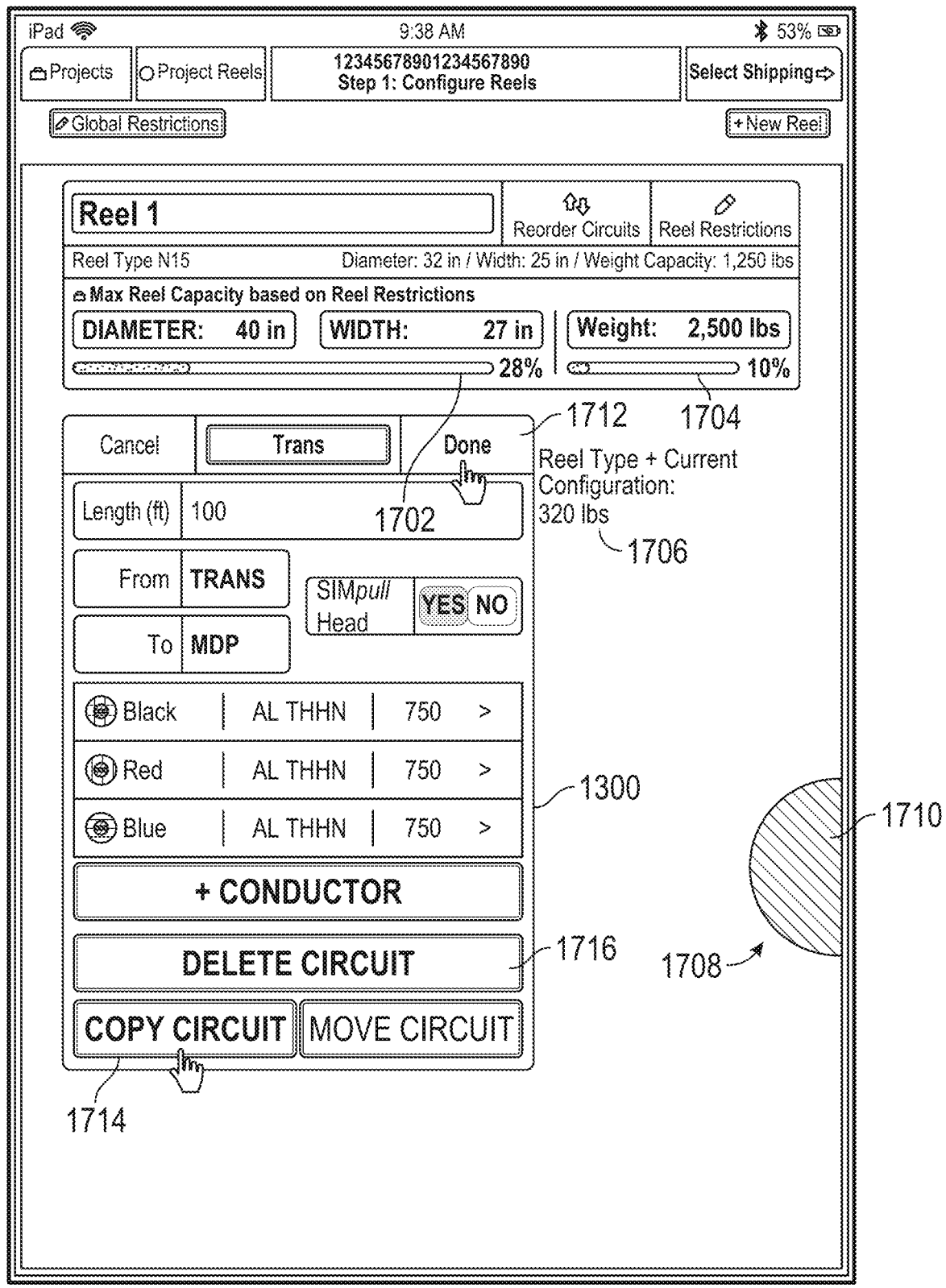

Once the user has selected a conductor type and conductor size, a color window 1600, as illustrated by FIG. 16, may be provided to allow the user to select color combinations. For example, as shown in FIG. 16, the color window 1600 may contain standard color combinations for preset numbers of conductors. For instance, for three conductors, a standard color combination may be a black conductor, a red conductor, and a blue conductor. While FIG. 16 shows multiple color combinations being selected, various embodiments include a user being able to select a single conductor having a sheathing of one or multiple colors. For example, a single conductor may have a solid green sheathing or may have a green sheathing with a colored stripe. When the user selects a color combination, the user may also be selecting a number of conductors based on the number of colors associated with the selected color combination. For example, if the user selects a black, red, and blue three conductor color combination 1602, the user is indicating that he or she wants three conductors having the same type, size, and length previously entered to be loaded on the reel with one conductor being black, one conductor being red, and one conductor being blue. Once the user has selected a color combination, he or she selects a done button 1604, and the configuration details are displayed in the feeder window 1300, as illustrated by FIG. 17. The user may select a done button 1712 once the user has finished configuring the circuit.

As the user adds conductors, the reel information updates automatically. For example, a percentage of the reel's diameter and width used 1702 and a percentage of the reel's weight used 1704 are adjusted automatically based on the added one or more circuits to be loaded on the reel. Moreover, an updated weight of the reel as configured 1706 may be provided based on the addition of the one or more circuits to the reel. In addition, a graphical representation 1708 of the reel's layout is displayed as, according to an illustrative embodiment, a semicircle. The graphical representation 1708 may correspond to the actual configuration of the circuits on the reel. For instance, a graphical representation of a first circuit 1710 (e.g., "TRANS" on FIG. 20) may be an inner circuit depicted on the graphical representation 1708 and also may be the inner circuit loaded on the physical reel produced by a manufacturer or supplier based on an order generated using the reel configurator application.

Figure 18:
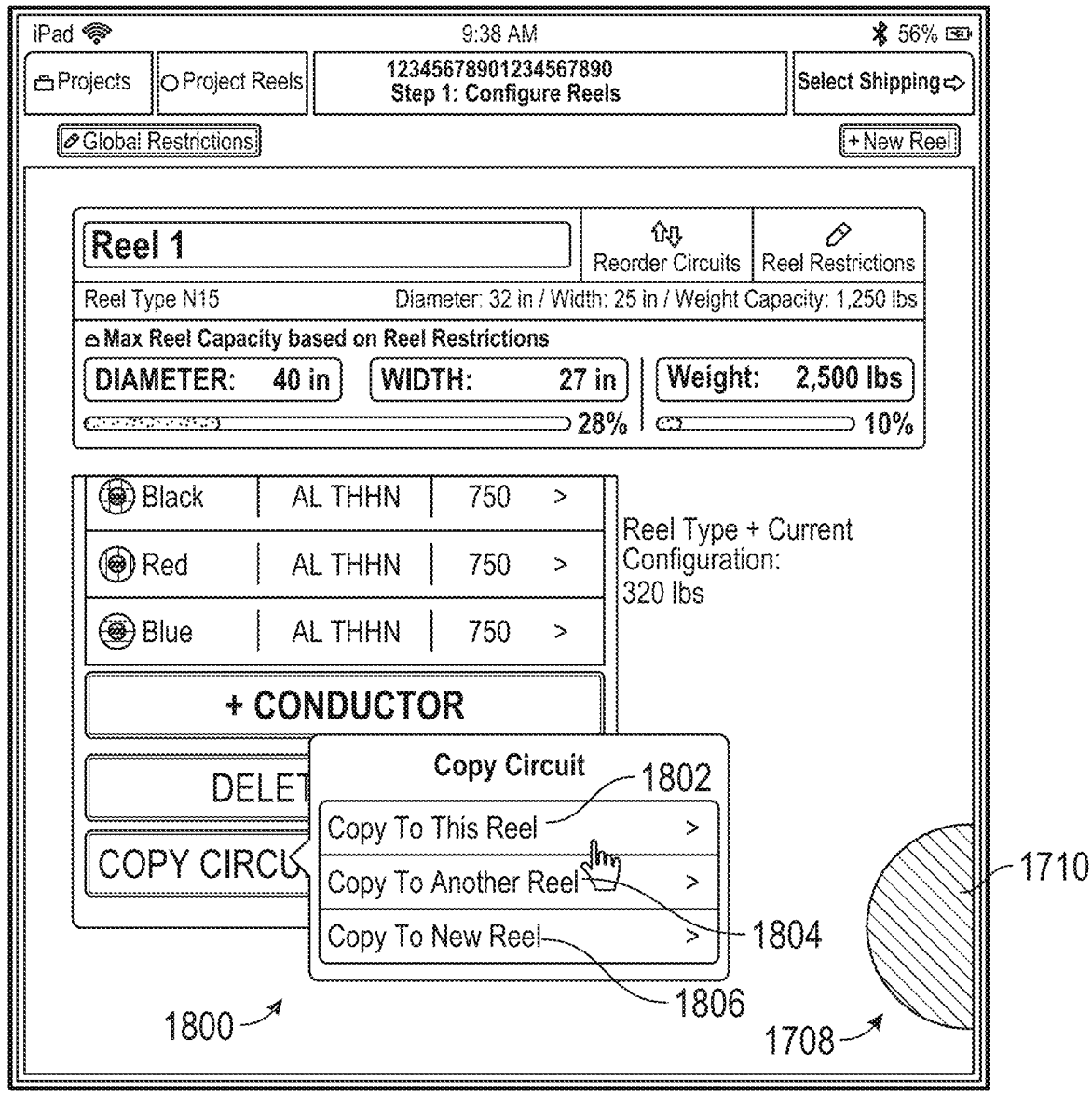
Figure 19:
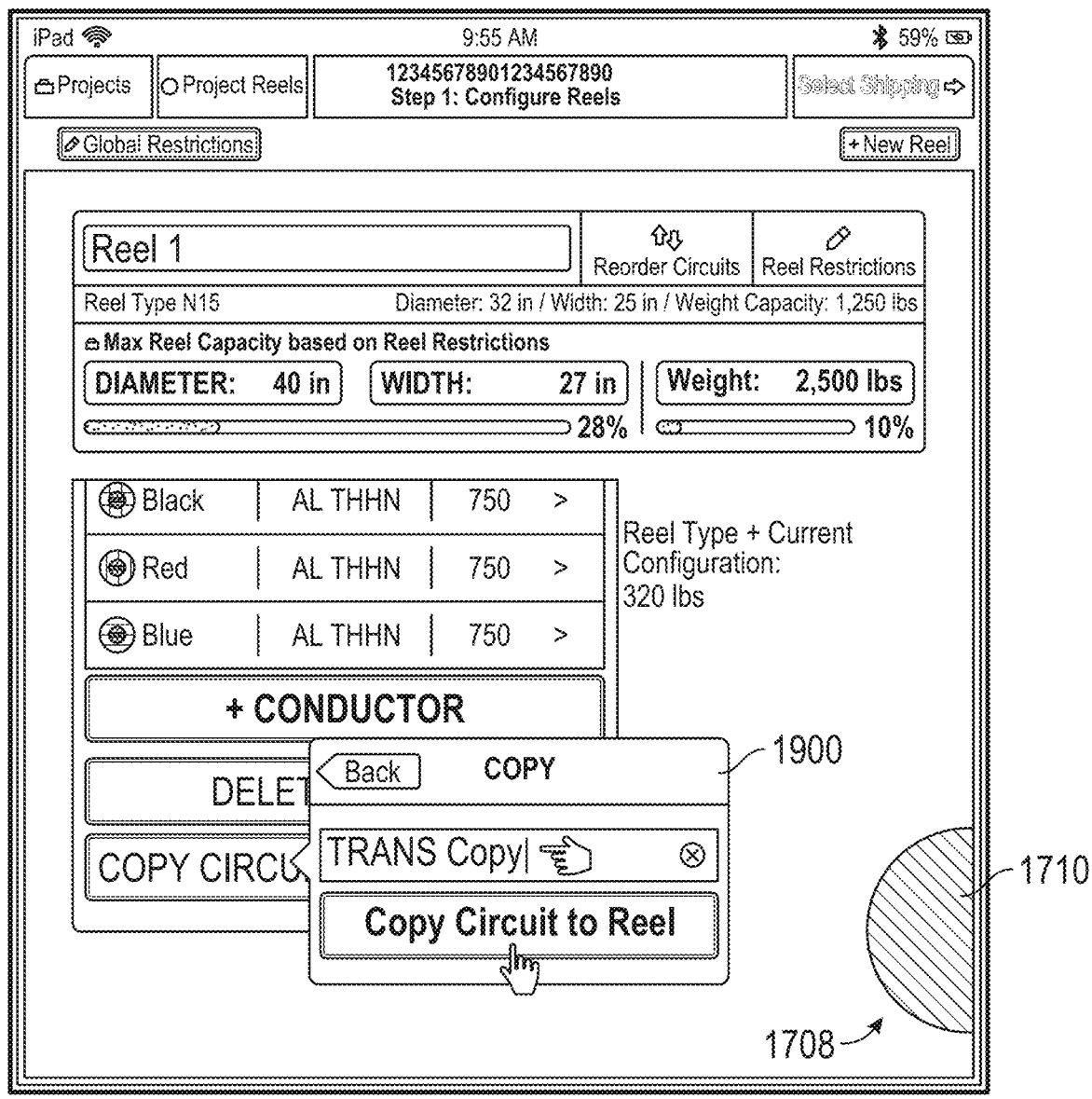

Referring back to FIG. 2, from operation 230 where a first circuit is added, the method 200 proceeds to decision block 235 to determine if a second circuit is to be added. If a second circuit is to be added, the method 200 proceeds back to operation 230 where the second circuit can be added as described above. In addition, as shown in FIG. 17, the user can select a copy circuit button 1714 to add a second circuit including the parameters of the circuit just configured. As shown in FIG. 18, once the copy circuit button 1714 has been selected, a copy circuit window 1800 may be provided. The copy circuit window 1800 provides the user with a first option 1802 to copy the circuit to the current reel, a second option 1804 to copy the circuit to another reel, and a third option 1806 to copy the circuit to a new reel. If the user selects the first option 1802 to copy the circuit to the current reel, then a copy window 1900, as illustrated by FIG. 19, is provided to allow the user to name the second circuit.

Once the second circuit is copied and named, a graphical representation of the second circuit 2002 (e.g., "TRANS 2" on FIG. 20) may be added to the graphical representation 1708. The position of the graphical representation of the second circuit 2002 on the outside of the graphical representation 1708 can indicate that the second circuit will be the second circuit loaded on the physical reel produced by the manufacturer based on an order generated using the reel configurator application and that the second circuit will be loaded on top of at least a portion of the first circuit loaded on the reel, as indicated by the positions of the first representation of the first circuit 1710 and the second representation of the second circuit 2002 on the graphical representation 1708 illustrated in FIG. 20. In other words, the graphical representation 1708 may indicate the circuit arrangement on the physical reel produced by the manufacturer based on an order generated using the reel configurator application. In addition, the graphical representation may indicate a side-by-side configuration of the circuits. For instance, the representation of the first circuit 1710 on the graphical representation 1708 may illustrate that the first circuit is loaded on a first half of a drum of the physical reel produced by the manufacturer based on an order generated using the reel configurator application and the representation of the second circuit 2002 on the graphical representation 1708 may illustrate that the second circuit loaded on the physical reel is loaded beside the first circuit 1710 on a second half of the drum of the physical reel produced by the manufacturer based on an order generated using the reel configurator application.

Figure 20:
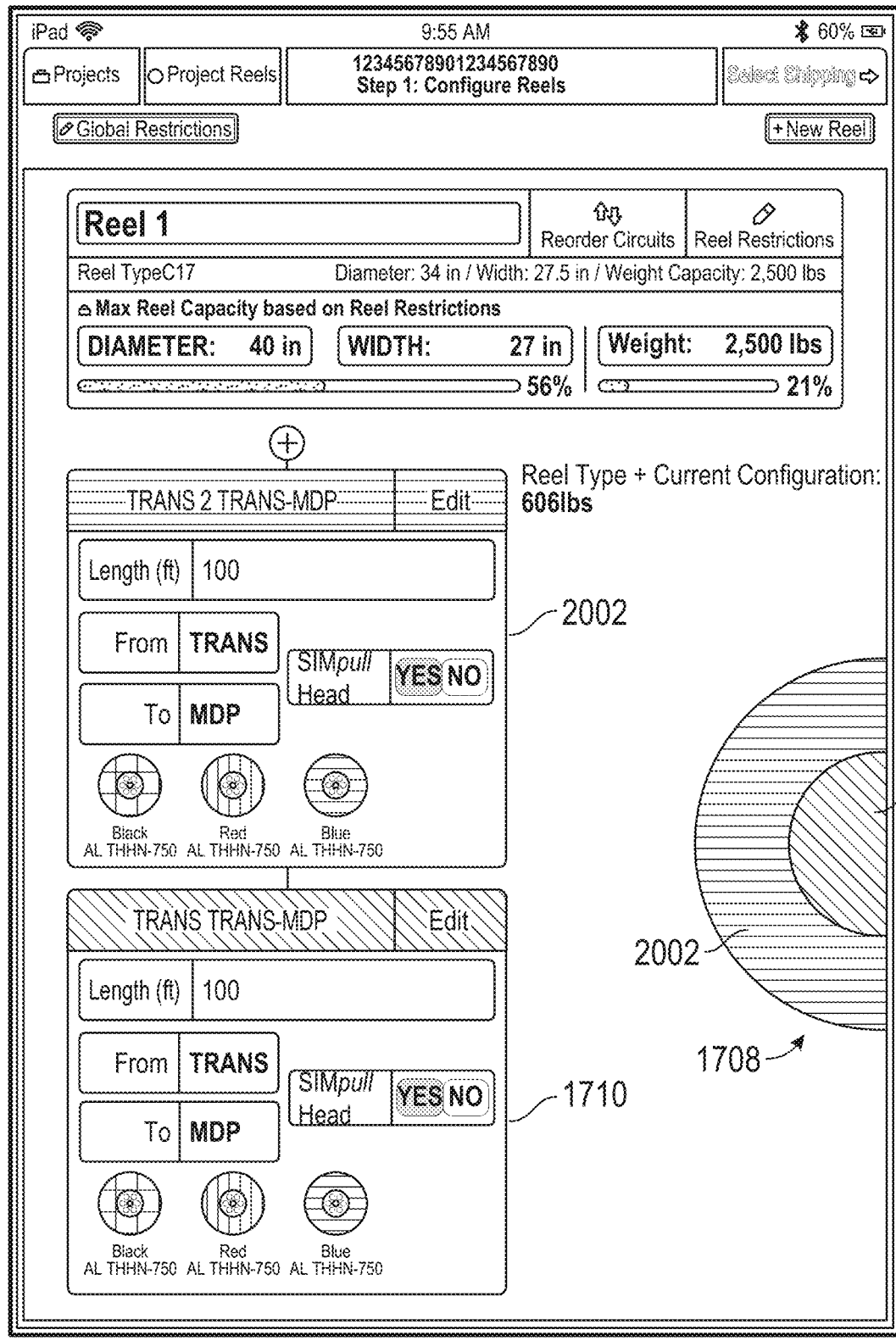
Figure 21:
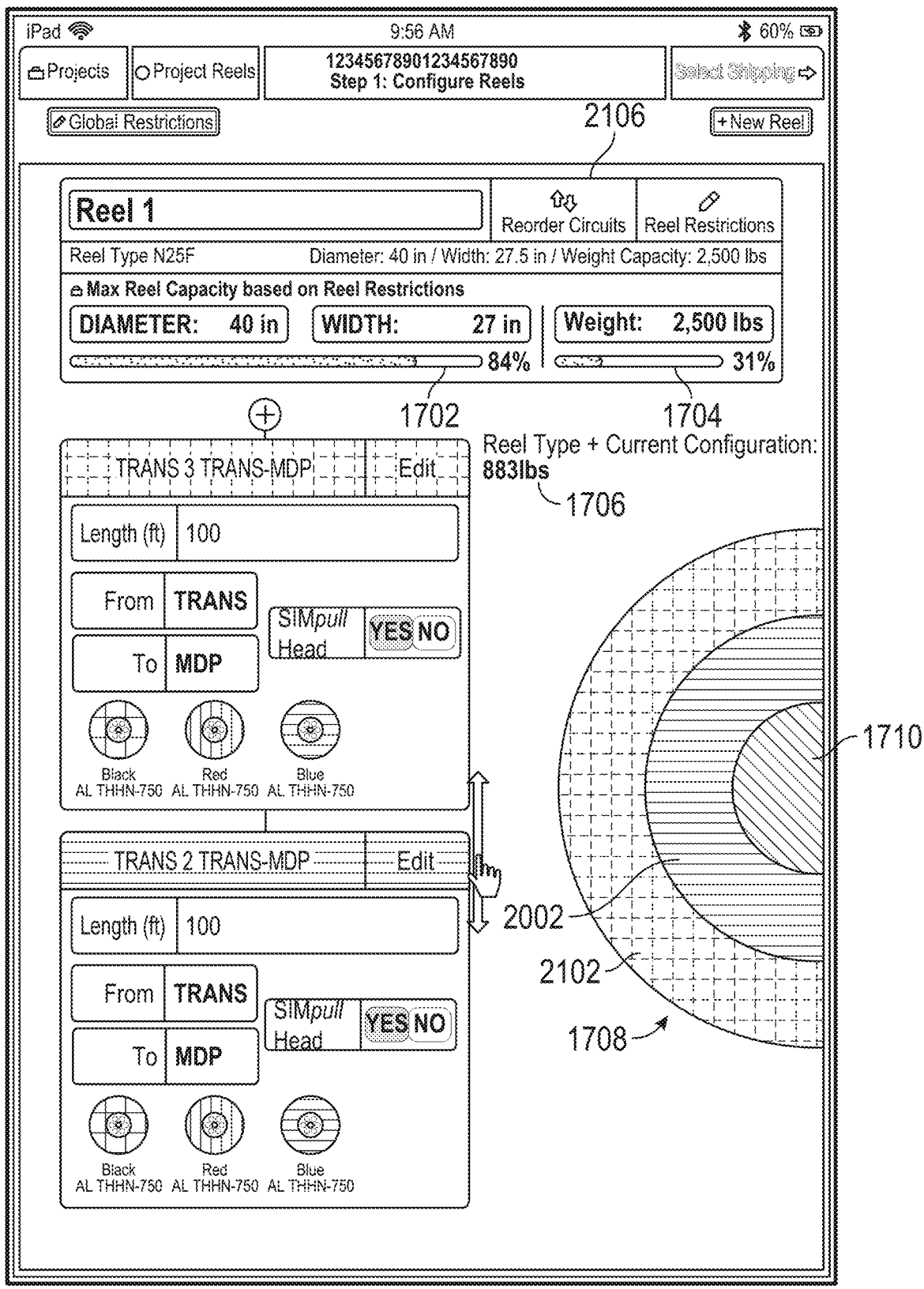

Once the user has copied the first circuit 1710, the reel information updates as well as shown in FIG. 20. The graphical representation 1708 showing the reel configuration may also be color-coded to match the circuit information. For example, the "TRANS" circuit information may have a green header, and the graphical representation of the first circuit 1710 on the graphical representation 1708 may be green as well. The graphical representation of the second circuit 2002 (e.g., "TRANS 2") on the graphical representation 1708 may have a blue color, and the "TRANS 2" circuit information may have a blue header. FIG. 21 shows where a third circuit, "TRANS 3", has been added to "Reel 1." The graphical representation 1708 is also updated to show a graphical representation of the third circuit 2102 on the reel. In addition, the percentage of the reel's diameter and width used 1702 and the percentage of the weight used 1704, along with the weight of the reel as configured 1706, adjust automatically.

Figure 22:
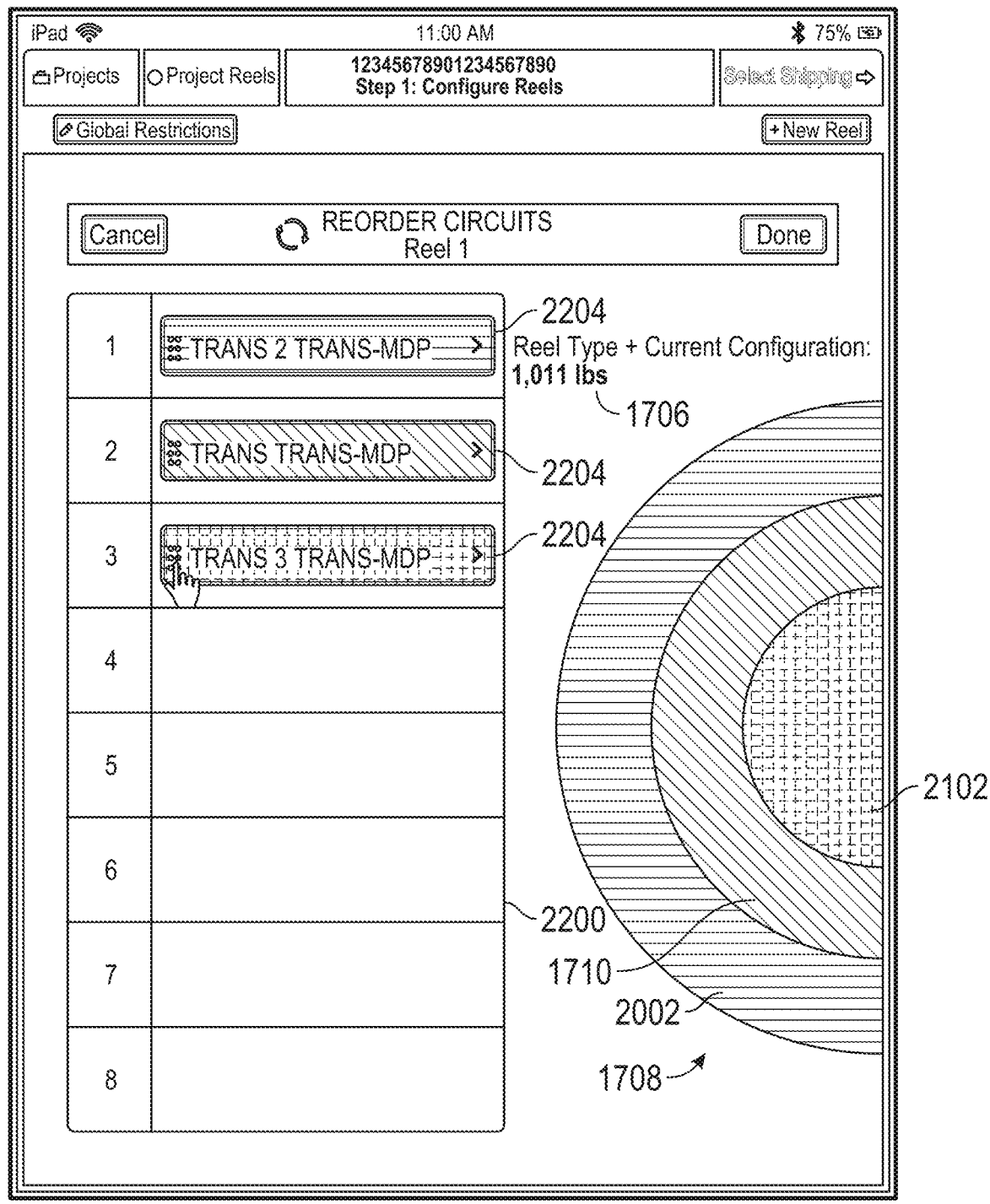
Figure 23:
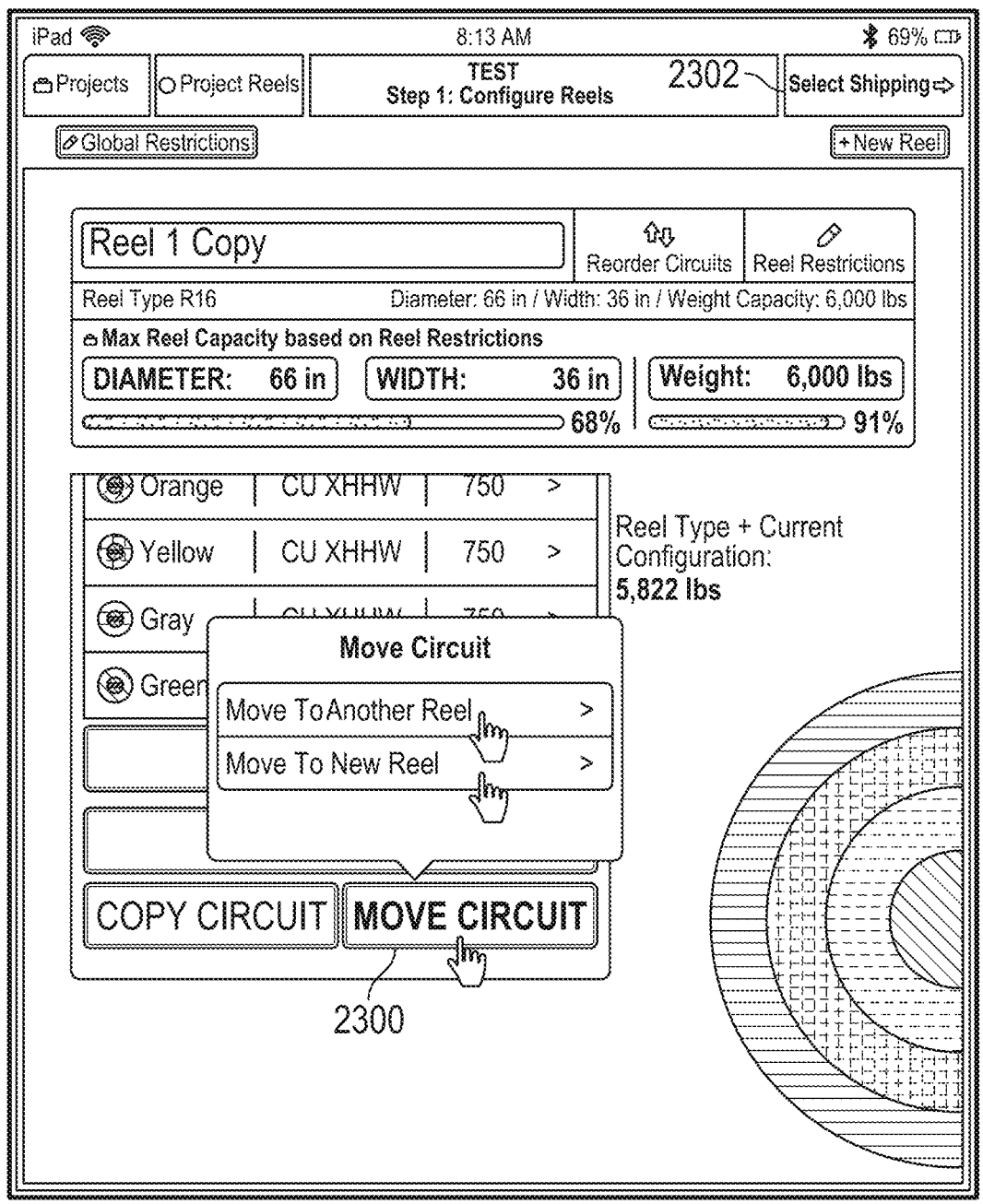

When another circuit is not to be added at decision block 235, the method 200 proceeds to stage 240 where circuits can be reordered on the reel. To reorder the circuits, the user selects a reorder circuits button 2106, illustrated on FIG. 21. Upon selecting the reorder circuits button 2106, a reorder circuits window 2200 (see FIG. 22) appears. Using the reorder circuits window 2200, the user can change the order of the circuits on the reel. To change the order of the circuits, the user can drag the circuits into a desired order. As the circuit order is changed the graphical representation 1708 also updates showing the new circuit order. For example, as shown in FIG. 22, the "TRANS 3" circuit illustrated by the graphical representation of the third circuit 2102 was in position 1 (see FIG. 21) and is now in position 3 (see FIG. 22). In addition, information about each circuit can be displayed by selecting on the ">" buttons 2204 to the right of the circuit labels. Furthermore, as shown in FIG. 23, circuits can also be moved to another existing reel or to a new reel by selecting a move circuit button 2300.

From stage 240 where the circuits were reordered, the method 200 proceeds to stage 245 where the circuits can be edited or deleted. For example, to edit a reel the user would select the circuit the user wishes to edit and edit the circuit and composition as described above regarding configuring and creating a circuit. To delete a circuit, the user would select the delete circuit button 1716 shown in FIG. 17.

From stage 245 where circuits are edited or deleted, the method 200 proceeds to decision block 250 to determine if another reel needs to be added. If another reel needs to be added, the method 200 proceeds to stage 225 where another reel is created. The method 200 can proceed from stage 225 through stage 245 to configure the newly added reel.

Once all the needed reels are created and configured, the method 200 proceeds from decision block 250 to stage 255 where the user configures shipping of the one or more reels created using the reel configurator application. For example, as shown in FIG. 23, the user can select a select shipping button 2302. As a safeguard against ordering an empty reel, the select shipping button 2302 may not be selectable unless all the reels for a project have at least one circuit configured via the method 200. Selecting the select shipping button 2302 causes a shipping menu 2400 (FIG. 24) to appear. Various shipping options may be presented via the shipping menu 2400. For example, the reels may be shipped via a standard shipping method, shipped on A-frames, or via a truck. When selecting a shipping configuration, the user may configure all reels using a configure all reels section 2402 of the shipping menu 2400. As shown in FIG. 25, if the user selects the configure all reels section 2402, a window 2500 appears where the user can select A-frame sizes. For instance, the user may select to ship the reel on a 4 foot A-frame 2502 or a 6 foot A-frame 2504.

Figure 24:
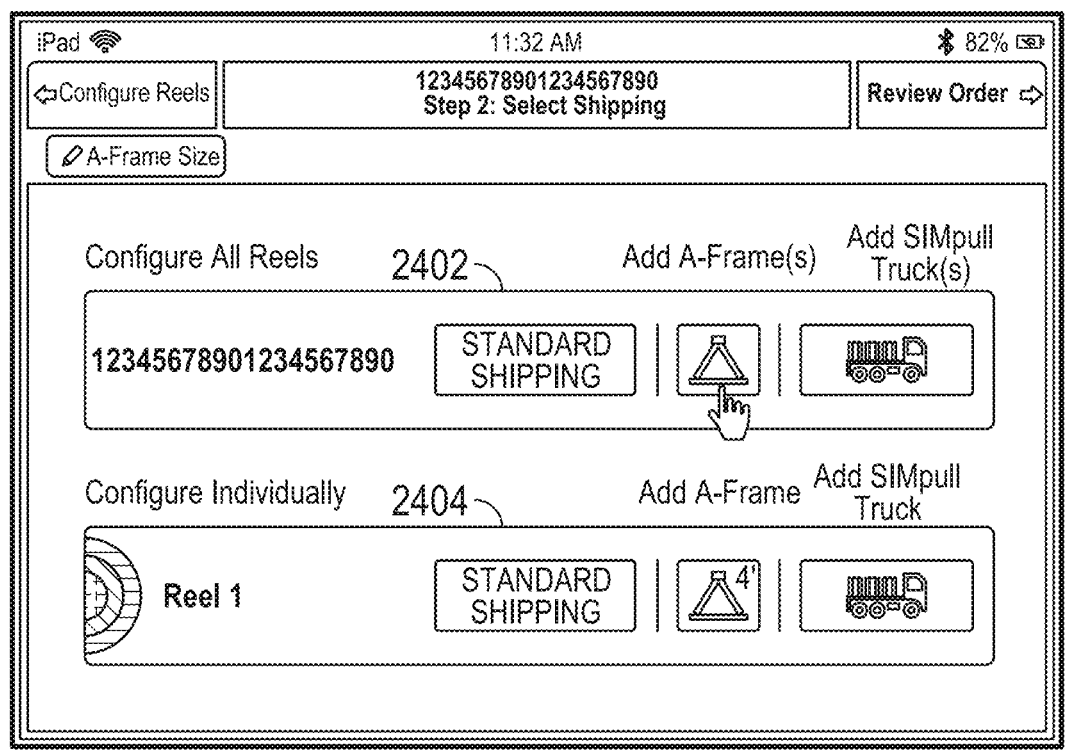
Figure 25:
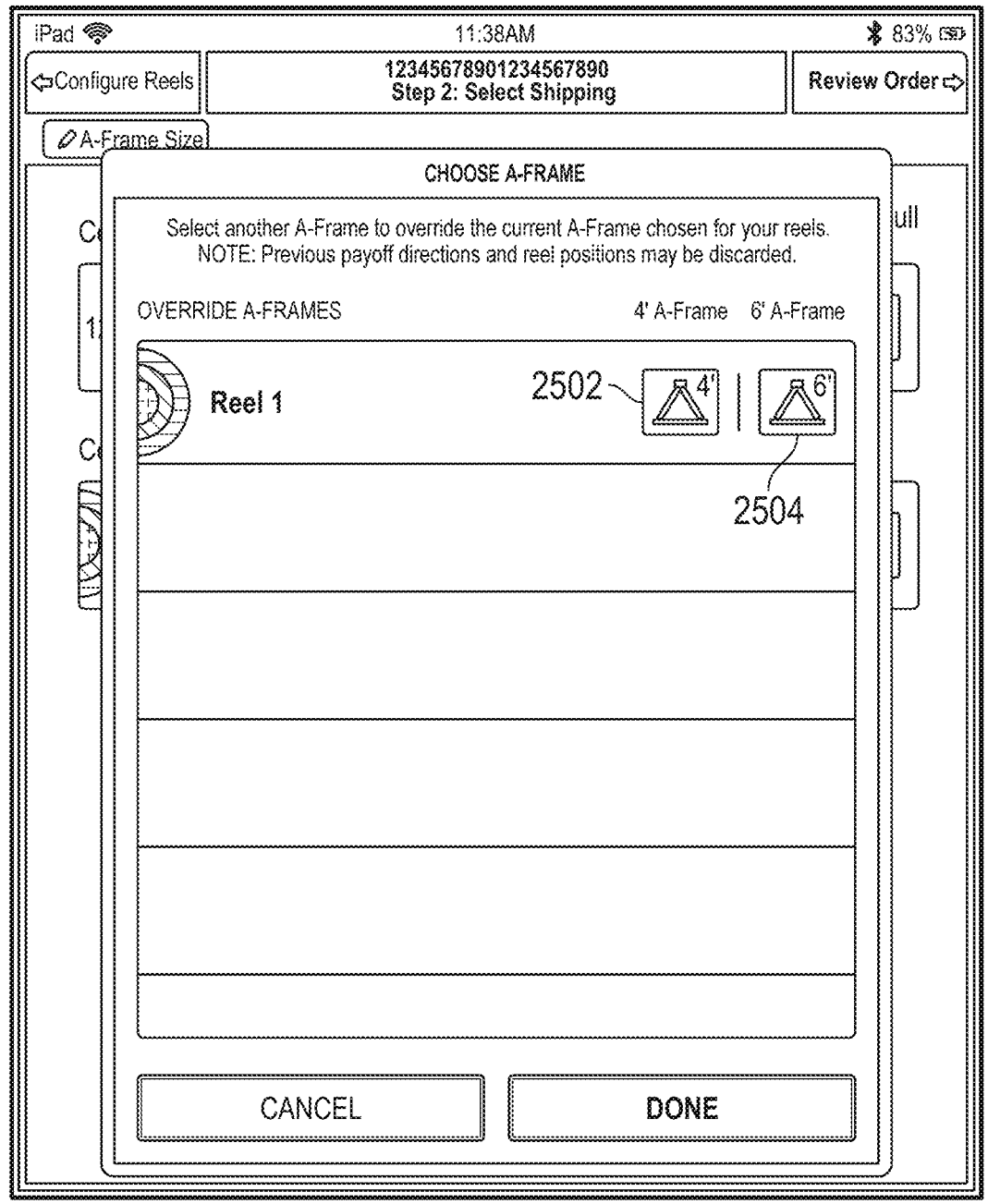
Figure 26:
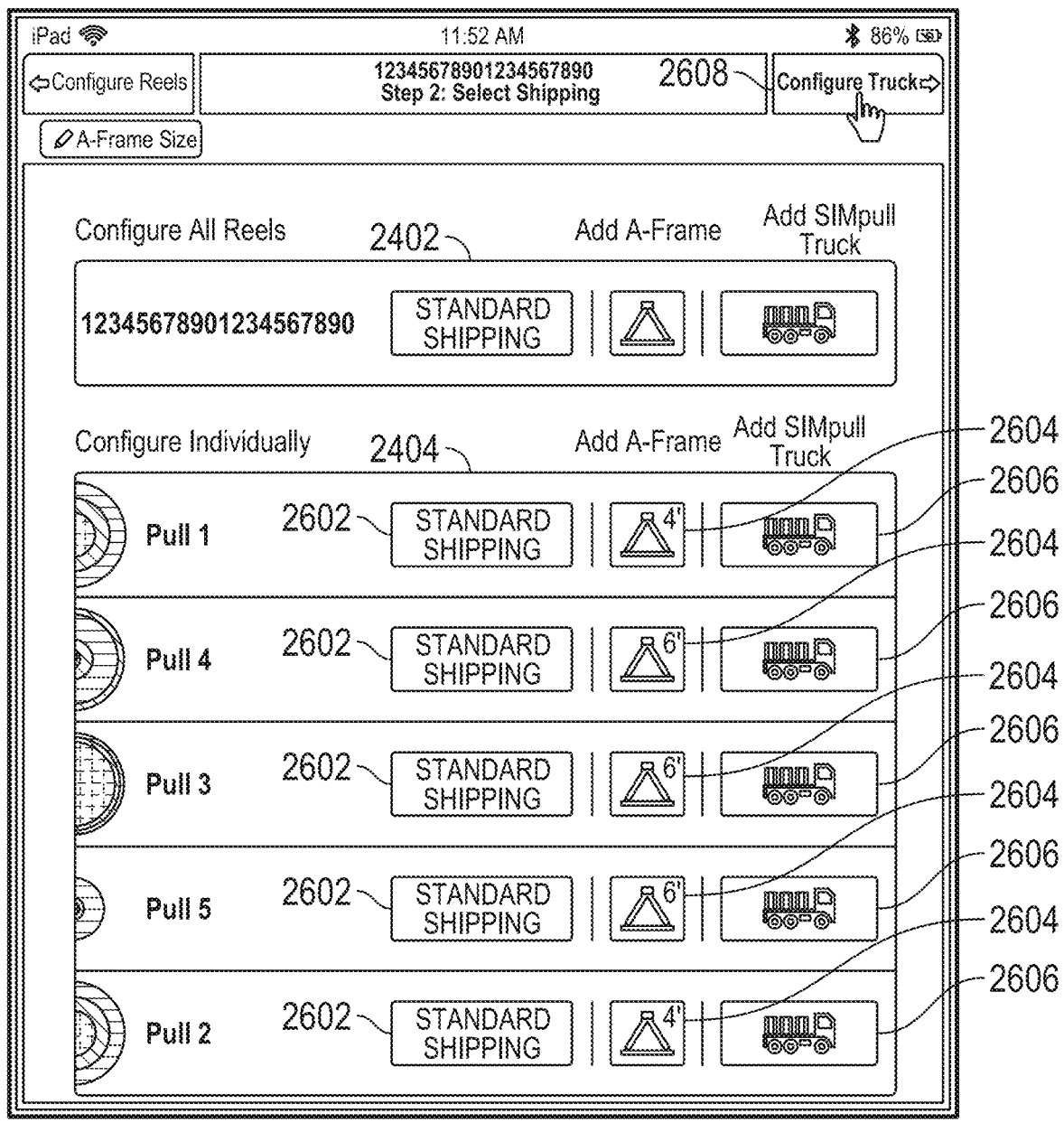

The user may also configure the shipping configuration of each reel separately using a configure individually section 2404 of the shipping menu 2400 illustrated at FIG. 24. As shown in FIG. 26, when the user elects to configure the reels individually, the user may choose standard shipping by selecting standard shipping buttons 2602, shipping via an A-frame by selecting the A-frame buttons 2604, or ship by truck by selecting the truck buttons 2606. The various methods may have default configurations. For example, when an A-frame is selected, the smallest A-frame a reel will fit on may be automatically selected by the reel configurator application. The user may change the size of the A-frame if he or she wishes as described above regarding FIG. 25.

Figure 27:
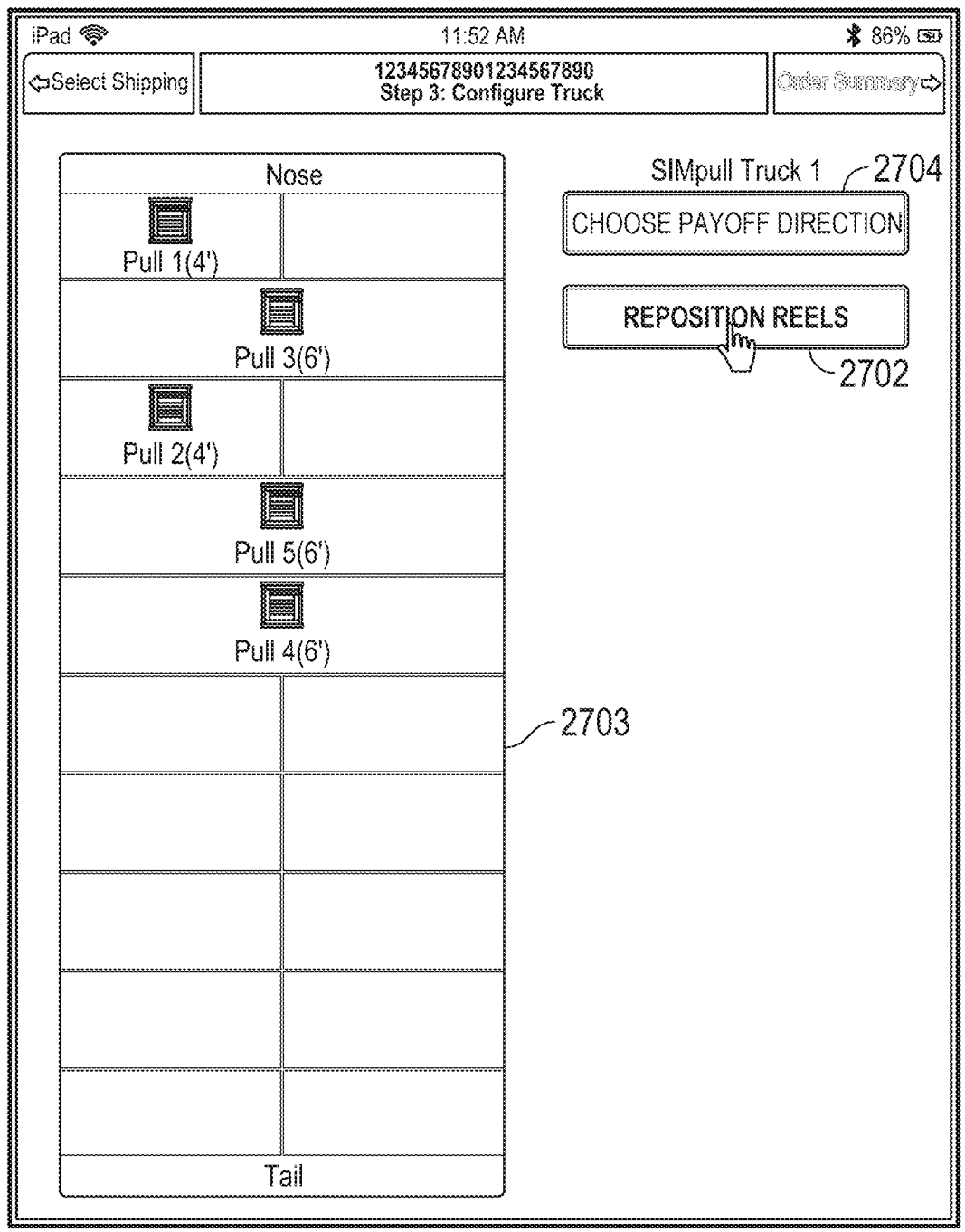

If the user chooses to ship the reels via a truck, as indicated by selection of one of the truck buttons 2606, the user may select a configure truck button 2608 to allow the user to configure the truck. Upon selecting the configure truck button 2608, a truck diagram 2700, as shown in FIG. 27, is displayed including a graphical representation of the truck 2703. Shipping the reels on a truck may entail the reels being shipped on A-frames placed on the truck. The user can change a location of each reel on the truck by selecting a reposition reels button 2702. Upon selecting the reposition reels button 2702, the user may then drag the reels to desired positions on the graphical representation of the truck 2703.

Figure 28:
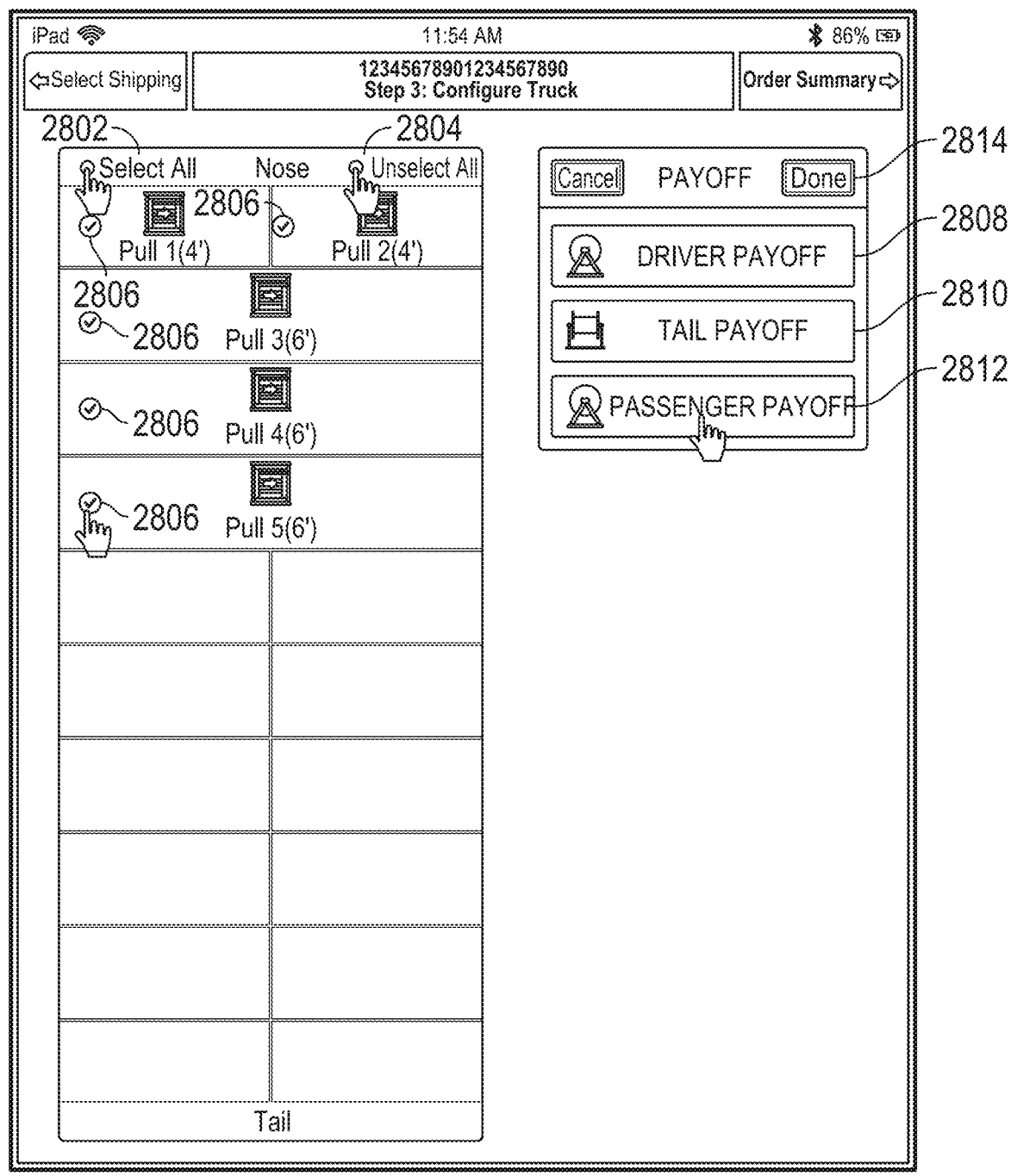

After placing the reels in desired locations on the graphical representation of the truck 2703, the user can choose a payoff direction by selecting a choose payoff direction button 2704. As shown in FIG. 28, upon selecting the choose payoff direction button 2704, the user may select all the reels using a select all button 2802 or unselect all the reels using an unselect all button 2804. In addition, the user may select each reel individually using radio buttons 2806. Once reels are selected, the user can select driver side payoff using a driver side payoff button 2808, a passenger side payoff using a passenger side payoff button 2812, or a tail payoff using a tail payoff button 2810. The reel configurator application may include limitations on the truck configurations. For example, the reel configurator application may allow 4 foot A-frames to be placed side by side and only allow 6 foot A-frames to be placed in the center of the truck. Once the truck has been configured, the user may select a done button 2814.

From stage 255 where the shipping is configured, the method 200 proceeds to stage 260 where an order can be reviewed and shared. The various reels and information about each reel are displayed in an order summary 2900, as illustrated by FIG. 29. For example, the order summary 2900 shows each reel, the number of circuits on each reel, and the shipping method configured by the user. By selecting a details button 2902 associated with each reel, the user can view the details of each reel. The user may also edit the project name and ID using a project name & ID button 2904. Furthermore, the user can share/email/print the project using a share/email/print button 2906. The user may also delete the project using a delete button 2908.

Upon selection of the share/email/print button 2906 a file, such as a portable document file (PDF), may be created. For example, as shown in FIGS. 30A-30C, a file 3000 may be displayed. The file 3000 may include multiple pages. For instance, FIG. 30A shows a first page, FIG. 30B shows a second page, and FIG. 30C shows a third page. The file 3000 may include various information. The various information may include, but is not limited to, a file description 3002, a project name 3004, a project contact 3006, a contact email 3008, a contact phone number 3010, and as described below, information about each reel within an order.

The information about each reel within the order may include a reel name 3012, reel specifications 3014 (e.g., reel dimensions and a reel weight), a reel number 3016, and a number of pulls (i.e., a number of circuits) on the reel 3018. For example, as shown in FIGS. 30A and 30B, the reel name 3012 for a first reel may be "MSB-B" and the reel name 3012 for a second reel may be "ATS." In addition, the reel specifications 3014 for the first reel may be that the first reel is 32 inches wide with a 25 inch diameter and weighs 1,124.6 pounds when loaded with conductors as configured using the reel configurator application as described herein.

More detailed information about each reel can also be included. For example, as shown in FIGS. 30A and 30B, detailed information about each pull, or circuit, can be included. For instance, each of the pulls, or circuits, can be shown with information about each of the pulls. As shown in FIGS. 30A and 30B, a pull length 3020 for each pull can be displayed. In addition, the various conductors can be shown along with specific information about each conductor. For example, a first conductor 3022, a second conductor 3024, and a third conductor 3026 can be shown. In addition to showing the various conductors, the conductor type 3028, the conductor size 3030, the color 3032 of the conductor's sheathing, and whether or not the conductor includes a SIMpull® pulling head 3034 can be shown for each conductor.

The conductor type 3028 can include indications as to the material the conductor is made of such as "CU" for copper, "AL" for aluminum, or "GL" for a glass fiber optic cable. The conductor size 3030 can include any available size conductor such as 20 gauge, 10 gauge, 0000 (sometimes referred to as "4/0"), or any other American wire gauge (AWG) size. The color 3032 of the conductor's sheathing can be any available color such as black, white, red, green, yellow, blue, or gray. The color 3032 may include a color strip showing the color as well as the color spelled out as shown in FIGS. 30A and 30B. Whether or not the conductor includes a SIMpull® pulling head 3034 can be indicated using a word, such as "yes" or "no," as shown in FIGS. 30A and 30B, or a picture. For example, instead of the word "yes" a picture of a pulling head may be displayed to indicate that a SIMpull® will be installed on a conductor.

In addition to the details for the various reels and circuits, a shipping summary 3036, as shown in FIG. 30C, may be included. The shipping summary 3036 may include a reel name section 3038, a standard shipping section 3040, an A-Frame section 3042, and a SIMpull® Truck section 3044. The reel name section 3038 may include a listing of each reel by reel name. The method of shipping each reel may be indicated by a checkmark or other indicator located in the standard shipping section 3040, the A-Frame section 3042, and the SIMpull® Truck section 3044. Furthermore, the shipping summary 3036 may also include the number of A-Frames. The number of A-Frames may include a breakdown of the various sizes of A-Frames and the total number of A-Frames. For instance, in an example order having four reels, a first reel may be shipped "standard" (i.e., without an A-Frame), a second reel may be shipped on a 4' A-Frame, a third reel and a fourth reel may each be shipped on a 6' A-Frame loaded onto a SIMpull® Truck.

The file 3000 can be printed and attached to each reel of an order. By attaching the printed file 3000 to each reel, users are able to see the configuration of each reel within an order alongside the physical reels. In addition, the file 3000 can be emailed to suppliers. As discussed below, the reel configurator application includes a submit button to allow a user to submit an order to a supplier. However, the user may want to submit the order to a supplier that is not able to receive a submission via the reel configurator application. In this case, the user can email or fax the file 3000 to the supplier. For example, the reel configurator application may be configured such that a submit for quote button 2910 (described below with reference to FIG. 31) only submits an order to Southwire Company, LLC. The user located in Utah may wish to send the order to a distributor of Southwire Company, LLC, perhaps a local company in Utah, instead of sending the order directly to Southwire Company, LLC, located in Georgia. In this instance, the user may configure reels using the reel configurator as described herein and email the file 3000 to the distributor of Southwire Company, LLC located in Utah. Allowing the user to email or fax the file 3000 to distributors may allow for time savings and speed up order fulfillment by allowing a user to send orders to distributors that are located closer to the user and able to fulfill the orders.

Figure 31:
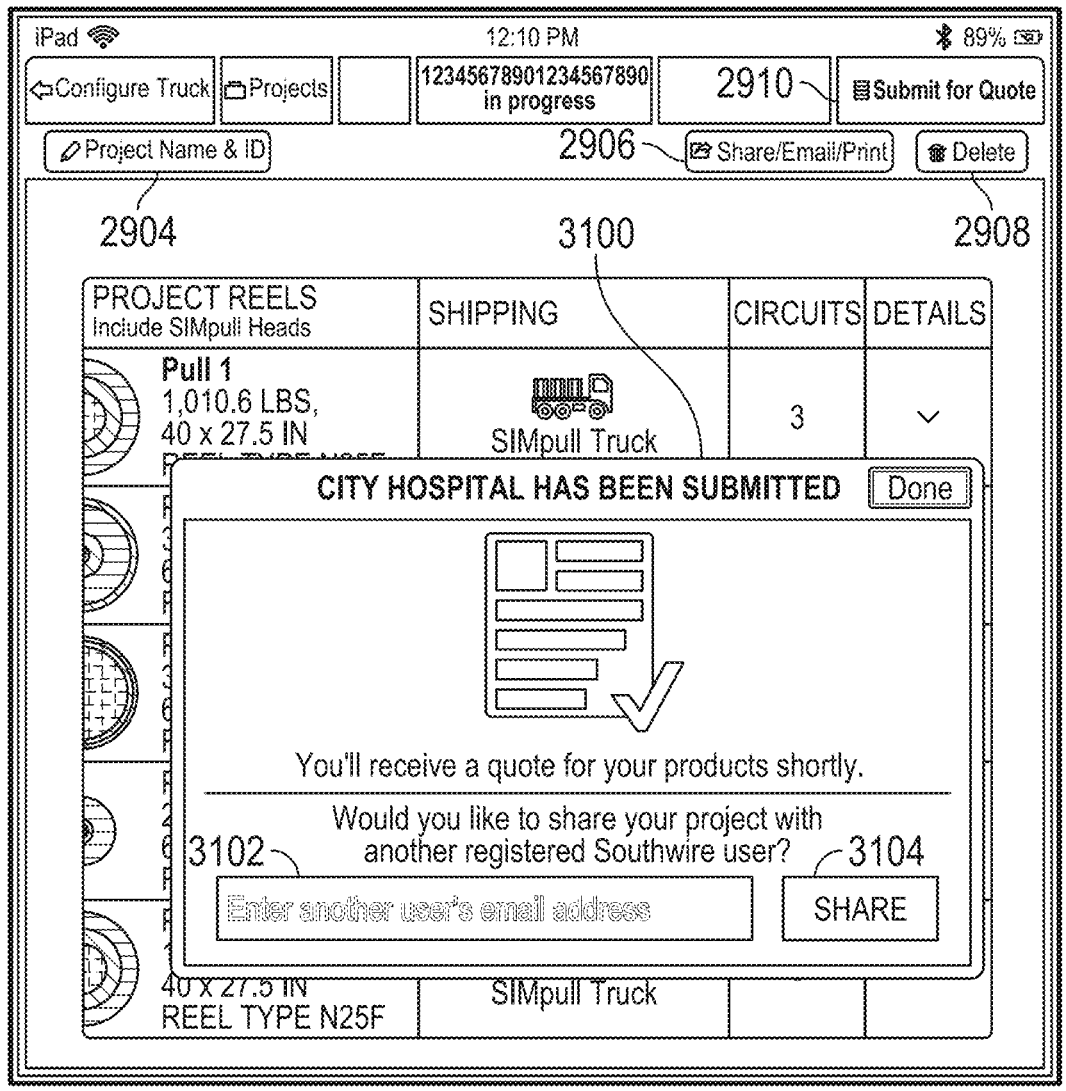

From stage 260 where the order is reviewed and shared, the method 200 proceeds to stage 265 where the order is submitted. For example, after reviewing the order, the user can submit the order for a quote by selecting a submit for quote button 2910, as illustrated by FIGS. 29 and 31. As shown in FIG. 31 after the user submits the order, a confirmation 3100 may be displayed. Upon submission, the order may be transmitted to a manufacturer, a distributor, or a supplier of the reels. The order may be received at the manufacturer, the distributor, or the supplier of the reels in a format that allows a program associated with the manufacturer, the distributor, or the supplier to easily process the order. For example, the received order may be in a format that allows the program associated with the manufacturer, the distributor, or the supplier of the reel to auto-populate various fields and minimize manual data entry. The user may also share the submitted order by entering an email address in a text field 3102 and selecting a share button 3104. From stage 265 where the order is submitted, the method 200 proceeds to stage 270 where the method 200 ends.

According to some embodiments, the cable includes a conductor or an assembly of cables and/or cable conductors, wire, rope or the like, on a cable reel holding the same. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as examples for embodiments of the invention.

What is claimed is:

1. A method comprising:
   providing, by a processor executing a reel configurator application, a reel user interface for creating a reel;
   receiving, by the processor, via the reel user interface, a first request to create a first circuit to be installed on the reel;
   receiving, by the processor, via the reel user interface, parameters associated with the first circuit;
   based on at least a portion of the parameters associated with the first circuit received via the reel user interface,
      providing, by the processor, via the reel user interface, a graphical representation of a layout of the reel, wherein the graphical representation of the layout of the reel comprises a first configuration of the first circuit on the reel, and
      providing, by the processor, via the reel user interface, a weight of the reel with the first circuit installed on the reel and a graphical representation of a percentage of a weight capacity of the reel used, wherein the graphical representation of the percentage of the weight capacity of the reel used updates based on an additional circuit requested for install on the reel; and
   graphically reordering, by the processor, the layout of the graphical representation of the reel based, at least in part, on input information associated with dragging the first circuit from a first position to a second position.

2. The method of claim 1, further comprising:
   receiving, by the processor, via the reel user interface, a second request to create a second circuit to be installed on the reel; and
   generating, by the processor, a first updated graphical representation of the layout of the reel based on the second request to create the second circuit, wherein the first updated graphical representation of the layout of the reel comprises a second configuration of the first circuit and the second circuit on the reel.

3. The method of claim 2, further comprising:
receiving, by the processor, via the reel user interface, a reposition request, the reposition request causing the first circuit and the second circuit to be repositioned on the reel; and
generating, by the processor, a second updated graphical representation of the layout of the reel based on the reposition request, wherein the second updated graphical representation of the layout of the reel comprises a third configuration of the first circuit and the second circuit repositioned on the reel based on the reposition request.

4. The method of claim 2, further comprising receiving parameters associated with the second circuit, the parameters associated with the second circuit comprising a conductor type of a conductor of the second circuit to be loaded on the reel, a conductor size of the conductor of the second circuit to be loaded on the reel, a conductor length of the conductor of the second circuit to be loaded on the reel, and a conductor color of the conductor of the second circuit to be loaded on the reel.

5. The method of claim 1, wherein the parameters associated with the first circuit comprise a conductor type of a conductor of the first circuit to be loaded on the reel, a conductor size of the conductor of the first circuit to be loaded on the reel, a conductor length of the conductor of the first circuit to be loaded on the reel, and a conductor color of the conductor of the first circuit to be loaded on the reel.

6. The method of claim 1, further comprising:
receiving, by the processor, a deletion request to delete the first circuit off the reel; and
in response to the deletion request, generating an updated graphical representation of the layout of the reel, wherein the updated graphical representation of the layout of the reel no longer comprises the first circuit.

7. The method of claim 1, further comprising:
receiving, by the processor, a shipping configuration for the reel; and
submitting, by the processor, an order for the reel to a supplier for a quote.

8. The method of claim 1, further comprising:
creating, by the processor, a project, the reel being associated with the project;
receiving, by the processor, from a user, global restrictions for the project; and
constraining, by the processor, all reels associated with the project based on the global restrictions without requiring the user to enter the global restrictions for each reel associated with the project.

9. The method of claim 1, further comprising:
receiving a request to move the first circuit from the reel to at least one of a new reel or a previously created reel;
in response to receiving the request to move the first circuit, generating an updated graphical representation of the layout of the reel, wherein the updated graphical representation of the layout of the reel no longer comprises the first circuit; and
updating a configuration of at least one of the new reel or the previously created reel to include the first circuit.

10. A computer storage medium storing instructions comprising a reel configurator application that, when executed by a processor, cause the processor to perform operations comprising:
providing a reel user interface for creating a reel;
receiving, via the reel user interface, a first request to create a first circuit to be installed on the reel;
receiving, via the reel user interface, parameters associated with the first circuit;
based on at least a portion of the parameters associated with the first circuit received via the reel user interface,
providing, via the reel user interface, a graphical representation of a layout of the reel, wherein the graphical representation of the layout of the reel comprises a first configuration of the first circuit on the reel, and
providing, via the reel user interface, a weight of the reel with the first circuit installed on the reel and a graphical representation of a percentage of a weight capacity of the reel used, wherein the graphical representation of the percentage of the weight capacity of the reel used updates based on an additional circuit requested for install on the reel; and
graphically reordering the layout of the graphical representation of the reel based, at least in part, on input information associated with dragging the first circuit from a first position to a second position.

11. The computer storage medium of claim 10, wherein the operations further comprise:
receiving, via the reel user interface, a second request to create a second circuit to be installed on the reel; and
generating a first updated graphical representation of the layout of the reel based on the second request to create the second circuit, wherein the first updated graphical representation of the layout of the reel comprises a second configuration of the first circuit and the second circuit on the reel.

12. The computer storage medium of claim 11, wherein the operations further comprise:
receiving, via the reel user interface, a reposition request, the reposition request causing the first circuit and the second circuit to be repositioned on the reel; and
generating a second updated graphical representation of the layout of the reel based on the reposition request, wherein the second updated graphical representation of the layout of the reel comprises a third configuration of the first circuit and the second circuit repositioned on the reel based on the reposition request.

13. The computer storage medium of claim 11, wherein the operations further comprise receiving parameters associated with the second circuit, the parameters associated with the second circuit comprising a conductor type of a conductor of the second circuit to be loaded on the reel, a conductor size of the conductor of the second circuit to be loaded on the reel, a conductor length of the conductor of the second circuit to be loaded on the reel, and a conductor color of the conductor of the second circuit to be loaded on the reel.

14. The computer storage medium of claim 10, wherein the parameters associated with the first circuit comprise a conductor type of a conductor of the first circuit to be loaded on the reel, a conductor size of the conductor of the first circuit to be loaded on the reel, a conductor length of the conductor of the first circuit to be loaded on the reel, and a conductor color of the conductor of the first circuit to be loaded on the reel.

15. The computer storage medium of claim 10, wherein the operations further comprise:
receiving a deletion request to delete the first circuit off the reel; and
in response to the deletion request, generating an updated graphical representation of the layout of the reel, wherein the updated graphical representation of the layout of the reel no longer comprises the first circuit.

16. The computer storage medium of claim 10, wherein the operations further comprise:
receiving a shipping configuration for the reel; and
submitting an order for the reel to a supplier for a quote.

17. The computer storage medium of claim 10, wherein the operations further comprise:
creating a project, the reel being associated with the project;
receiving, from a user, global restrictions for the project; and
constraining all reels associated with the project based on the global restrictions without requiring the user to enter the global restrictions for each reel associated with the project.

18. The computer storage medium of claim 10, wherein the operations further comprise:
receiving a request to move the first circuit from the reel to at least one of a new reel or a previously created reel;
in response to receiving the request to move the first circuit, generating an updated graphical representation of the layout of the reel, wherein the updated graphical representation of the layout of the reel no longer comprises the first circuit; and
updating a configuration of at least one of the new reel or the previously created reel to include the first circuit.

19. A system comprising:
a processor; and
a memory storing instructions comprising a reel configurator application that, when executed by the processor, cause the processor to perform operations comprising:
providing a reel user interface for creating a reel,
receiving, via the reel user interface, a first request to create a first circuit to be installed on the reel,
receiving, via the reel user interface, parameters associated with the first circuit,
based on at least a portion of the parameters associated with the first circuit received via the reel user interface,
providing, via the reel user interface, a graphical representation of a layout of the reel, wherein the graphical representation of the layout of the reel comprises a first configuration of the first circuit on the reel, and
providing, via the reel user interface, a weight of the reel with the first circuit installed on the reel and a graphical representation of a percentage of a weight capacity of the reel used, wherein the graphical representation of the percentage of the weight capacity of the reel used updates based on an additional circuit requested for install on the reel, and
graphically reordering, by the processor, the layout of the graphical representation of the reel based, at least in part, on input information associated with dragging the first circuit from a first position to a second position.

20. The system of claim 19, wherein the operations further comprise:
receiving, via the reel user interface, a second request to create a second circuit to be installed on the reel;
generating a first updated graphical representation of the layout of the reel based on the second request to create the second circuit, wherein the first updated graphical representation of the layout of the reel comprises a second configuration of the first circuit and the second circuit on the reel;
receiving, via the reel user interface, a reposition request, the reposition request causing the first circuit and the second circuit to be repositioned on the reel; and
generating a second updated graphical representation of the layout of the reel based on the reposition request, wherein the second updated graphical representation of the layout of the reel comprises a third configuration of the first circuit and the second circuit repositioned on the reel based on the reposition request.

* * * * *